(12) United States Patent  (10) Patent No.: US 9,639,755 B2
Gueguen  (45) Date of Patent: May 2, 2017

(54) AUTOMATED COMPOUND STRUCTURE CHARACTERIZATION IN OVERHEAD IMAGERY

(71) Applicant: DigitalGlobe, Inc., Longmont, CO (US)

(72) Inventor: Lionel Gueguen, Longmont, CO (US)

(73) Assignee: DigitalGlobe, Inc., Westminster, CO (US)

( * ) Notice: Subject to any disclaimer, the term of this patent is extended or adjusted under 35 U.S.C. 154(b) by 394 days.

(21) Appl. No.: 14/163,008

(22) Filed: Jan. 24, 2014

(65) Prior Publication Data

US 2015/0154465 A1  Jun. 4, 2015

Related U.S. Application Data

(60) Provisional application No. 61/911,073, filed on Dec. 3, 2013.

(51) Int. Cl.
*G06K 9/46* (2006.01)
*G06K 9/00* (2006.01)

(52) U.S. Cl.
CPC ......... *G06K 9/0063* (2013.01); *G06K 9/4676* (2013.01)

(58) Field of Classification Search
None
See application file for complete search history.

(56) References Cited

U.S. PATENT DOCUMENTS

2013/0202213 A1* 8/2013 Adamek ................. G06K 9/42
382/201
2014/0119646 A1* 5/2014 Matsunaga .......... G06K 9/6281
382/165

OTHER PUBLICATIONS

Lionel Gueguen et al., "Tree Based Representation for Fast Information Mining From VHR Images," IPSC—Global Security and Crisis Management Unit, Joint Research Centre, European Commission, Oct. 2012.*
Martino Pesaresi et al., "A Global Human Settlement Layer from Optical High Resolution Imagery, Concept and First Results," Joint Research Centre, European Commission, Institute for the Proection and Security of the Citizen, Dec. 2012.*

(Continued)

*Primary Examiner* — Fred Hu
(74) *Attorney, Agent, or Firm* — Marsh Fischmann & Breyfogle LLP; Jonathon A. Szumny; Robert G. Crouch

(57) ABSTRACT

A system for automatically characterizing areas of interest (e.g., urban areas, forests, and/or other compound structures) in high resolution overhead imagery through manipulation of a dictionary of visual words. The pixels of an input overhead image are initially clustered into a plurality of hierarchically-arranged connected components of a first hierarchical data structure. Image descriptors (e.g., shape, spectral, etc.) of the connected components are then clustered into a plurality of hierarchically-arranged nodes of a second hierarchical data structure. The nodes at a particular level in the second hierarchical data structure become a dictionary of visual words. Subsets of the visual words may be used to label the cells of a grid over the geographic area as falling into one of a number of areas of interest. Categorization information from the grid may be mapped into a resultant image whereby pixels depict their respective type of area of interest.

18 Claims, 20 Drawing Sheets

(56) References Cited

OTHER PUBLICATIONS

Lionel Gueguen et al., "Hierarchical Data Representation Structures for INteractive Image Information Mining", International Journal of Image and Data Fusion, Sep. 2012, vol. 3, Issue 3.*

Lionel Gueguen et al., "Tree Based Representations for Fast Information Mining From VHR Images," IPSC—Global Security and Crisis Management Unit, Joint Research Centre, European Commission, Oct. 2012.

Martino Pesaresi et al., "A Global Human Settlement Layer from Optical High Resolution Imagery, Concept and First Results," Joint Research Centre, European Commission, Institute for the Protection and Security of the Citizen, Dec. 2012.

Lionel Gueguen et al., Hierarchical Data Representation Structures for Interactive Image Information Mining, International Journal of Image and Data Fusion, Sep. 2012, vol. 3, Issue 3.

Martino Pesaresi et al., "A Global Human Settlement Layer from Optical HRA/HR RS data: concept and first results," IEEE Journal of Selected Topics in Applied Earth Observations and Remote Sensing, Aug. 15, 2013, vol. 6, No. 5.

P. Monasse et al., "Fast Computation of a Contrast-Invariant Image Representation," IEEE Transactions on Image Processing, May 2000, vol. 9, Issue 5.

\* cited by examiner

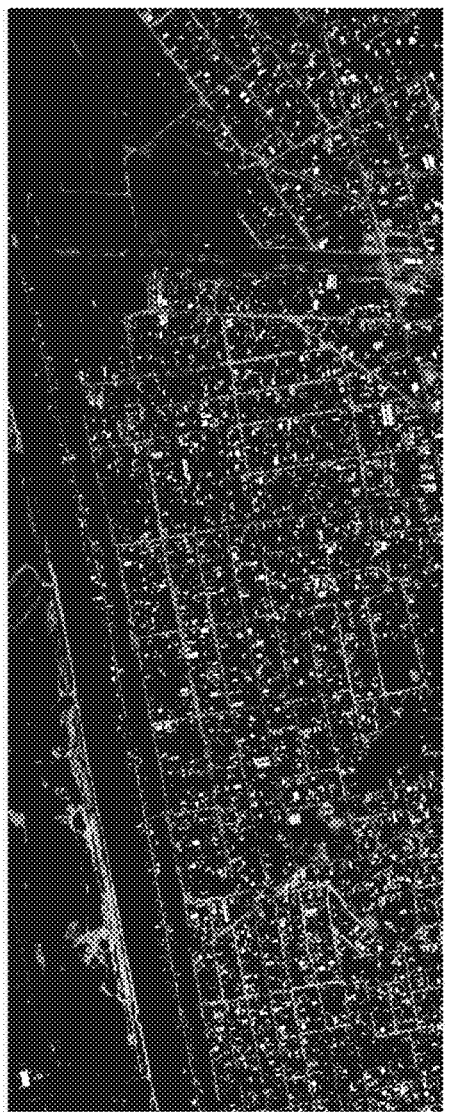
FIG. 18a
FIG. 18b

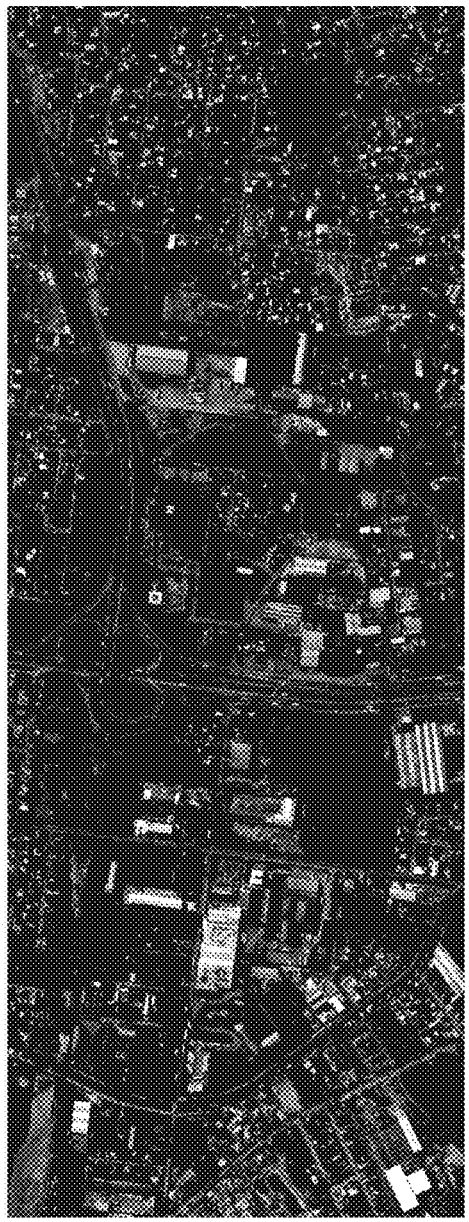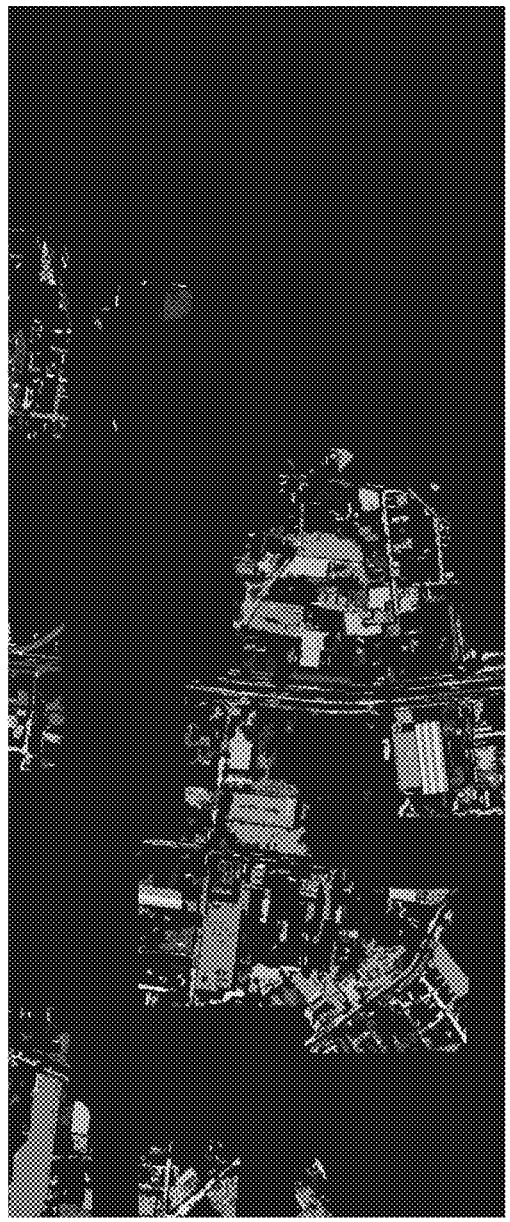
FIG. 19a
FIG. 19b

AUTOMATED COMPOUND STRUCTURE CHARACTERIZATION IN OVERHEAD IMAGERY

CROSS-REFERENCE TO RELATED APPLICATION

This application claims priority to U.S. Provisional Patent App. No. 61/911,073, entitled "AUTOMATED COMPOUND STRUCTURE CHARACTERIZATION IN OVERHEAD IMAGERY," and filed on Dec. 3, 2013, the entire contents of which is incorporated herein as if set forth in full.

BACKGROUND

The use of geospatial or overhead imagery has increased in recent years and represents a significant tool that may be utilized in a number of contexts. As such, high quality geospatial imagery has become increasingly valuable. For example, a variety of different entities (e.g., individuals, governments, corporations, or others) may utilize geospatial imagery (e.g., satellite imagery) for a multitude of applications in a variety of contexts.

With increasingly capable satellites being commissioned and launched, very high resolution (VHR) remotely-sensed multispectral Earth imagery has become increasingly available and useable. For example, as the number of satellite image acquisition systems in operation grows, acquisition ability and flexibility improves. In an example, DigitalGlobe, Inc. of Longmont, Colo. currently operates a number of satellites including, IKONOS, GeoEye-1, QuickBird, WorldView 1, and WorldView 2, with an anticipated launch of WorldView 3. Accordingly, around the clock global coverage may be achieved through the satellite constellation currently in operation. For instance, the DigitalGlobe constellation of satellites can image the entire Earth's landmass every 75 days and may capture over six times the Earth's landmass every year with a capacity to collect at least 2.6 million square kilometers of imagery a day. With selective tasking, DigitalGlobe's satellite constellation may quickly and continually collect imagery from targeted locations to provide near real time feedback on global events or the like.

Furthermore, the resolution of image acquisition satellites also continues to increase. For instance, currently operated satellites may acquire images with a maximum spatial resolution of 50 cm (wherein each pixel in the images corresponds with the distance measure of the spatial resolution). Additionally, planned satellite launches may provide even greater resolution capabilities with spatial resolutions as high as about 30 cm or greater (i.e., less than 30 cm, such as 25 cm, 15 cm, or lower).

In this light, the amount and quality of VHR remotely-sensed multispectral Earth imagery continues to increase as does the amount and types of image data collected. Accordingly, the nature of the VHR remotely-sensed multispectral Earth imagery may facilitate uses beyond simply providing pixels as image data. For instance, higher level data processing may be applied to the images to, for example, identify objects, identify textures, or otherwise extract useful data from the raw image data. One such application has been in land use identification and land classification, where remotely-sensed images are analyzed to categorize pixels of an image into a category of land use or land class. As just one example, image pixels can be categorized or analyzed to identify and/or characterize areas of the urban settlement (e.g., the urban "build-up" or "built-up," such as three-dimensional man-made structures or the like).

As the amount of image data that is available grows and the nature of the image data acquired changes and is improved, advanced image data processing and image analytics are needed to keep pace with the advances in image acquisition technology to facilitate new techniques applied to acquired images to expand the number of applications for which such technology may be used.

SUMMARY

Broadly, disclosed herein are utilities (e.g., systems, processes, etc.) for automatically characterizing compound structures in high resolution overhead imagery by treating the overhead imagery as a collection of spatially unordered "visual words" and then analyzing the frequencies (e.g., prevalences) of one or more of the visual words within each cell of a grid of cells over the geographic area to categorize an overall compound structure of the cells. As used herein, a "compound structure" is a composition of image structures representing a concept on the ground such as built-up, forests, orchards, etc. in portions of a scene or geographic area. As an example, a first subset of all of the visual words may be used to categorize the cells of a first grid as falling within or not within a first compound structure type and a second subset of all of the visual words may be used to categorize the cells of a second grid as falling within or not within a second compound structure type, wherein one or more parameters (e.g., width, overlap) of the cells of the first and second grids are different. Each of the first and second subsets of visual words and corresponding connected components (groups of pixels) of the overhead imagery described by each of the first and second subsets of visual words may be loaded from storage into memory for fast access thereof and corresponding categorization decisions. One or more of the grids may be mapped into a resultant image of the geographic area whereby each cell depicts (e.g., by color, shading, texturing, etc.) its respective type of compound structure.

Initially, one or more input overhead images (e.g., multispectral) of a particular geographic area may be appropriately decomposed or otherwise broken down into any appropriate image space representation (e.g., space-partitioning data structures for organizing data points, such as a multi-scale segmentation) that automatically groups or clusters pixels of the overhead image(s) into a plurality of connected segments or components that represent "dominant" structures or portions of the image(s) (where the total number of connected components is far less than the total number of pixels in the image(s), such as 10% or less). For example, the input overhead image(s) may be decomposed, by at least one processor of any appropriate computing device(s), into a plurality of connected components of a first hierarchical data structure such as a Min-Tree, a Max-Tree, and/or the like. In the case of a Max-Tree, the hierarchical data structure may be a rooted, uni-directed tree with its leaves corresponding to a regional maxima of the input image(s) and its root corresponding to a single connected component defining the background of the input image(s). For instance, the image(s) may be thresholded at each grey level to provide as many binary images as the number of grey levels, where each binary image may be analyzed to derive its connected components.

One or more image descriptors or feature elements (e.g., spectral, geometrical, shape, morphological, etc.) may be derived or otherwise determined (by the processor(s)) from or for each of the connected components that convey important information embedded in the overhead image(s). For instance, the joint usage of spectral and shape descriptors may allow for the differentiation between similar materials that are spatially arranged in different manners. The derived or extracted image descriptors may then be clustered into a plurality of nodes of a second hierarchical data structure that collectively represents the feature or image descriptor space of the overhead image(s). For instance, the nodes of the second hierarchical data structure may be arranged into a plurality of leaf paths that each extend from a single root node of the second hierarchical data structure to one of a plurality of leaf nodes, where one or more of the image descriptors depends from one of the plurality of leaf nodes. As one non-limiting example, the general clustering technique may include a KD-Tree based space partitioning procedure that generates a KD-Tree based on the plurality of image descriptors.

Any "cut" in the second hierarchical data structure may then create a dictionary of visual words that may be used to categorize connected components and thus each cell or tile of one or more grids overlaid onto the geographic area as part of the automatic computation of the compound structure representation of the geographic area. As an overly simplistic example, assume that a cut was made at a four-node level of the second hierarchical data structure. In this case, the respective collection of image descriptors depending from each of the four nodes would represent a visual word resulting in four visual words in this example. For instance, the four visual words in this example could be red circular structures/portions, yellow circular structures/portions, red rectangular structures/portions, and yellow rectangular structures/portions, respectively.

The visual words may then be used, by the processor(s), to categorize the various cells of a grid overlaid onto the geographic area in any appropriate manner. In one embodiment, the respective frequencies of each of the visual words within each cell may be determined and used to characterize the type of compound structure(s) found within the cell. For instance, the at least one image descriptor of each connected component present within the cell may be compared to those of each of the visual words. The connected component may be then classified as the particular visual word whose at least one image descriptor is closest to the at least one image descriptor of the connected component (e.g., as measured by a smallest distance between the at least one image descriptor of the component and the at least one image descriptor of the particular visual word). A similar process may be performed with other connected components present (e.g., entirely) within the cell.

After each component is classified, the respective frequencies of the visual words within the cell may be updated and then the overall frequencies of the visual words within the cell may be used to categorize the overall type of compound structure(s) of or found within the cell. For example, it may be known that urban areas typically manifest themselves as a first combination of visual word frequencies (e.g., 10% visual word #1, 59% visual word #2, and 31% visual word #3) while orchards typically manifest themselves as a different second combination of visual word frequencies (e.g., 0% visual word #1, 40% visual word #2, and 60% visual word #3). The particular collection of visual word frequencies of each cell (e.g., which may, in one embodiment, be used to populate a plurality of corresponding entries in a histogram or vector of entries for the cell) may then be compared to known visual word frequency combinations (e.g., similar to the manner in which connected components were classified as a particular one of the visual words) to categorize the cell as a particular one of a plurality of types of compound structures (e.g., urban areas, fields, orchards, or the like). In one arrangement, a user may be able to manually select (e.g., on a user interface in any appropriate manner) or otherwise provide a number of positive and/or negative examples (e.g., training samples) of each compound structure type for use in the categorization process. In the event that a user provides a positive example of an orchard in the overhead image(s) of the particular geographic area, for instance, the particular visual word frequencies within the selected positive area(s) may be automatically extracted and used in the categorization process of other cells or portions of the geographic area in the manners disclosed herein.

A dictionary with a greater number of specific visual words may be created by making the cut at a level closer to the leaf nodes while a dictionary with a lower number of more general/broad visual words may be created by making the cut at a level closer to the root node. For instance, a cut at the two-node level of the above example may result in a first visual word of circular structures/portions (all colors) and a second visual word of rectangular structures/portions (all colors). The visual words may then be used to categorize compound structures of the geographic area. Greater numbers of visual words may result in a more fine-grained categorization with reduced computational efficiency while lower numbers of visual words may result in a more coarse-grained categorization with increased computational efficiency.

One or more particular parameters of the cell grids may be selected to fine-tune the cell grids to identify different types of compound structures, to increase the accuracy of the categorization process, and/or the like. In one embodiment, an overlap parameter may be selected to increase the likelihood that connected components are entirely found within at least one cell (e.g., such as by increasing the degree to which adjacent cells in each grid overlap each other). For instance, increasing the overlap parameter may increase the resolution of the categorization process by increasing the number of cells needed to cover the geographic area, and vice versa. In another embodiment, a width parameter of the cells of the grid may be selected to correspond to the type of compound structure being detected in the overhead image(s) of the geographic area. For instance, the semantic or compound structure "destroyed building" may be best described by finding rubble pieces (e.g., identified by a particular combination of visual word frequencies) within a spatial extent which is about that of a building scale, such as 10 meters, while the semantic or compound structure "orchard" may be best described by finding trees within a spatial extent which has the dimension of a field greater than about 100 meters. In this case, a first grid could be created having cells with width parameters of 10 meters to identify destroyed buildings and a second grid could be created having cells with width parameters of 100 meters to identify orchards. The first and second grids may both be overlaid onto the overhead image(s) of the geographic area to automatically and simultaneously detect destroyed buildings and orchards within the overhead image(s) of the geographic area as disclosed herein.

Various measures may be taken to increase the computational efficiency of and/or otherwise facilitate the automatic characterization (e.g., categorization) processes disclosed herein. In one arrangement, a subset of visual words from the dictionary of visual words may be selected and used to categorize the cells over the geographic area. Stated differently, as opposed to determining the visual word frequencies of all visual words in the dictionary for each cell, only the frequencies of a smaller, select number of visual words may be determined, where the frequency of the smaller, select number of visual words in a cell is highly revealing or telling as to whether or not a particular compound structure type is present within the cell. In the case of a dictionary having ten visual words, for instance, only three of the visual words may be important in determining whether or not the cells in a geographic area are or are not urban areas. That is, the presence or absence of the other seven visual words may have little or no bearing on whether or not the cells include or represent urban areas. Use of a subset of all visual words as disclosed herein may facilitate the categorization process by limiting or avoiding determination of all visual word frequencies and the corresponding computation resources required therefore.

Continuing with the above example, any connected components within the geographic area classified by one of the three visual words may be identified (e.g. a subset of all connected components). Additionally, any cells containing (e.g., fully) at least one of the connected components classified by one of the three visual words may be identified (e.g., a subset of all cells). At this point, the respective visual word frequencies in each cell in the subset of cells may be obtained and used to determine whether or not such cells represent urban areas. Any portions of cells not in the subset and not overlapped by cells that do represent urban areas may be presumed to not be urban areas. Furthermore, a similar process may be performed with other subsets of visual words and other grids of cells (e.g., having different width parameters and/or overlap parameters) for other compound structure types (e.g., orchards, fields, etc.).

In one arrangement, respective weighting values may be assigned to each of the visual words to convey a relative importance each visual word has in determining whether or not a cell is to be categorized as a particular compound structure type. Again continuing with the above example, the presence or absence of the first of the three visual words in the subset may be the most indicative as to whether or not a particular cell represents an urban area and thus may be assigned a weighting value of 60 out of 100. However, the presence or absence of the second and third of the three visual words in the subset may be less indicative (than the first of the three visual words in the subset) as to whether or not a particular cell represents an urban area and thus may each be assigned lower weighting values of 20 out of 100. In the case of a cell having three connected components contained therein (where each connected component is classified as one of the three visual words in the subset), the frequency of each respective visual word in the cell may be determined (e.g., such as by determining a prevalence of the respective connected component within the cell) and multiplied by its respective weighting value and then the three products may be added to obtain a sum. For instance, the cell may be categorized as an urban area if the sum meets or exceeds a particular threshold while the cell may not be categorized as an urban area if the sum does not meet the threshold (e.g., or vice versa).

To allow for rapid queries (e.g., cell categorizations) while considering a limited subset of all of the visual words, an "inverted" file for storing the compound structure representation in a compact or compressed form may be implemented. For instance, an initial classification of all connected components of the first hierarchical data structure for the geographic area as one of the visual words may be performed. Each connected component may then be indexed according to the visual word by which the component is classified and maintained in any appropriate storage device and/or location. For instance, visual word #1 may include a corresponding list of connected components (e.g., where each connected component is identified by dimensions and/or coordinates within the overhead image(s) of the geographic area); visual word #2 may include a corresponding list of connected components; and so on. Before a particular compound structure type categorization process is to begin, only the connected component lists corresponding to particular visual words needed to categorize the particular compound structure type may be appropriately extracted from the storage location and loaded into memory (e.g., volatile memory) to facilitate access to the visual words and corresponding connected components for purposes of categorizing one or more grids of cells.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrases "at least generally," "at least partially," "substantially" or the like in relation to a particular feature encompass the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 18a illustrates a close up view of another portion of the multispectral image of FIG. 12.

FIG. 18b illustrates visual words detected in the illustration of FIG. 18a that are used to detect the second compound structure type of FIG. 15, where different visual words are differently colored, shaded, etc.

FIG. 19a illustrates a close up view of another portion of the multispectral image of FIG. 12.

FIG. 19b illustrates visual words detected in the illustration of FIG. 19a that are used to detect the third compound structure type of FIG. 16, where different visual words are differently colored, shaded, etc.

DETAILED DESCRIPTION

Figure 1:
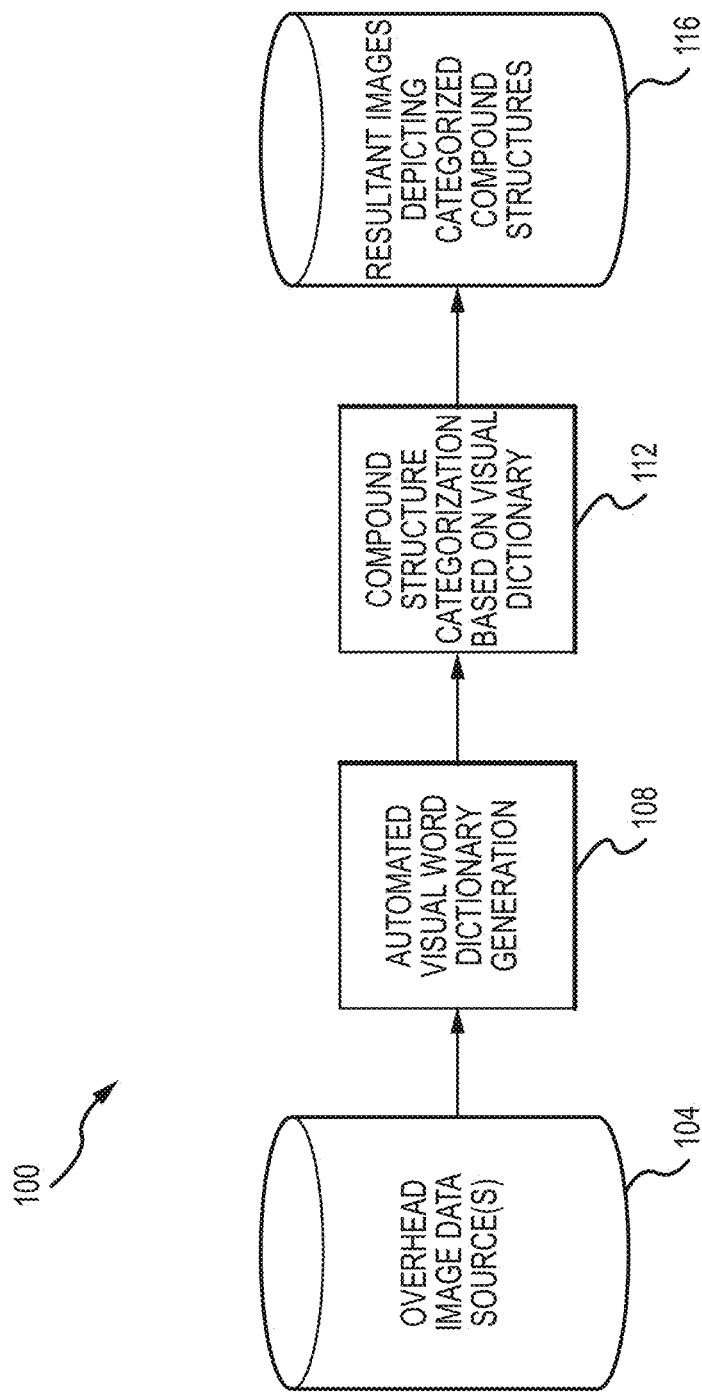
FIG. 1 is a simplified block diagram illustrating a process of detecting or characterizing compound structures in overhead imagery data.

Disclosed herein are utilities (e.g., systems, processes, etc.) for automatically characterizing (e.g., categorizing) various types of "compound" structures (e.g., urban areas, residential areas, informal settlements, orchard, fields, forests, etc.) in overhead imagery (e.g., HR/VHR imagery) of geographic areas at various levels of granularity in manners that limit or reduce use of computational resources. The disclosed utilities broadly treat the overhead imagery as a collection of spatially unordered "visual words" and then analyze the frequencies (e.g., prevalences) of the visual words within each cell of a grid of cells over the geographic area to categorize the cells as one of a number of types of compound structures.

For instance, the pixels of one or more input overhead images of a geographic area may be broken down or decomposed into any appropriate image space representation (e.g., first hierarchical data structure) that automatically groups pixels into connected components (e.g., dominant segments). Thereafter, one or more images descriptors (e.g., spectral, shape, etc.) of the various connected components may be determined (e.g., derived, obtained, ascertained) and appropriately organized into a feature space such that automatically clusters the image descriptors into a plurality of hierarchically-arranged levels of nodes of a second hierarchical data structure. Any "cut" in the second hierarchical data structure at a particular level may then create a dictionary of visual words respectively represented by the image descriptors encompassed by the nodes at the particular level. One or more such grids may be mapped into a resultant image of the geographic area whereby each cell depicts (e.g., by color, shading, texturing, etc.) its respective type of compound structure and thus various compound structure types within the geographic area as a whole. Resultant images can be used in numerous contexts such as in assessing population densities, qualities of life, vulnerability factors, disaster risks, sufficiency of civil infrastructures, economic growth, poverty levels, event monitoring and evolution, and the like.

At the outset, it is noted that, when referring to the earth herein, reference is made to any celestial body of which it may be desirable to acquire images or other remote sensing information. Furthermore, when referring to "overhead" imagery herein, such imagery may be obtained by any spacecraft, satellite, aircraft, and/or the like capable of acquiring images or other remote sensing information. Furthermore, the utilities described herein may also be applied to other imaging systems, including imaging systems located on the earth or in space that acquire images of other celestial bodies. It is also noted that the figures contained herein are not necessarily drawn to scale and that such figures have been provided for the purposes of discussion and illustration.

Generally, high resolution images of selected portions of a celestial body's surface have become a product desired and used by government agencies, corporations, and individuals. For instance, many consumer products in common use today include images of the Earth's surface, such as Google® Earth. Various types of remote sensing image collection platforms may be employed, including aircraft, earth-orbiting satellites, and the like. In the case of a consumer digital camera, as one non-limiting example, an image sensor is generally arranged in an area array (e.g., 3,000 rows of 3,000 pixels each, or 9,000,000 total pixels) which collects the image area in a single "snapshot." In the case of satellite-based imaging, as another non-limiting example, the "pushbroom scanning" principle is sometimes employed whereby each image sensor includes a relatively small number of rows (e.g., a couple) of a great number of pixels (e.g., 50,000 or more) in each row. Each row of pixels may be scanned across the earth to build an image line by line, and the width of the image is the product of the number of pixels in the row times the pixel size or resolution (e.g., 50,000 pixels at 0.5 meter ground resolution produces an image that is 25,000 meters wide). The length of the image is controlled by the scan duration (i.e. number of lines), which is typically settable for each image collected. The resolution of overhead images varies depending on factors such as the particular instrumentation utilized, the altitude of the satellite's (or other aircraft's) orbit, and the like.

Image collection platforms (e.g., aircraft, earth-orbiting satellites, etc.) may collect or acquire various types of imagery in one or more manners. As one non-limiting example, image collection platforms may perform panchromatic collection of scenes of a celestial body which generally refers to the collection of image data across a single broad range of wavelengths (e.g., all visible light, from near infrared (NIR) to near ultraviolet (NUV), etc.). As another non-limiting example, image collection platforms may additionally or alternatively capture image data within the visible light band and include respective filters to separate the incoming light into red, green and blue portions. As a further non-limiting example, image collections platforms may additionally or alternatively perform multispectral collection of scenes of a celestial body which generally refers to the collection of image data at multiple specific spectral bands across the electromagnetic spectrum (e.g., within bands both inside and outside of the visible light range such as NIR, short wave infrared (SWIR), far infrared (FIR), etc.). For instance, a satellite may have one image sensor that is sensitive to electromagnetic radiation across only a first spectral band (e.g., the visible light band, such as a wavelength range of about 380-750 nm) in addition to one or more additional image sensors that are sensitive to electromagnetic radiation only across other spectral bands (e.g., NIR, 750-1400 nm; SWIR, 1400-3000 nm; etc.). Multispectral imaging may allow for the extraction of additional information from the radiance received at a satellite after being reflected from the Earth's surface (which may include atmospheric effects such as from aerosols, clouds, etc.).

Turning now to FIG. 1, a simplified block diagram of a system 100 that may be used to automatically characterize various types of compound in overhead imagery (e.g., <1-10 m spatial resolution satellite image data obtained by a number of heterogeneous platforms such as SPOT 2 and 5, CBERS 2B, RapidEye 2 and 4, IKONOS® 2, QuickBird 2, WorldView 1 and 2) is disclosed. Initially, the system 100 obtains one or more overhead images of a geographic from any appropriate overhead image data sources 104 and performs the automated generation 108 of a visual word dictionary from the overhead images as disclosed herein. The system 100 then performs categorization 112 of compound structures in the overhead image(s) using the visual word dictionary and generates resultant images 116 that depict or convey one or more detected or characterized compound structure types in the overhead image(s).

Figure 2:
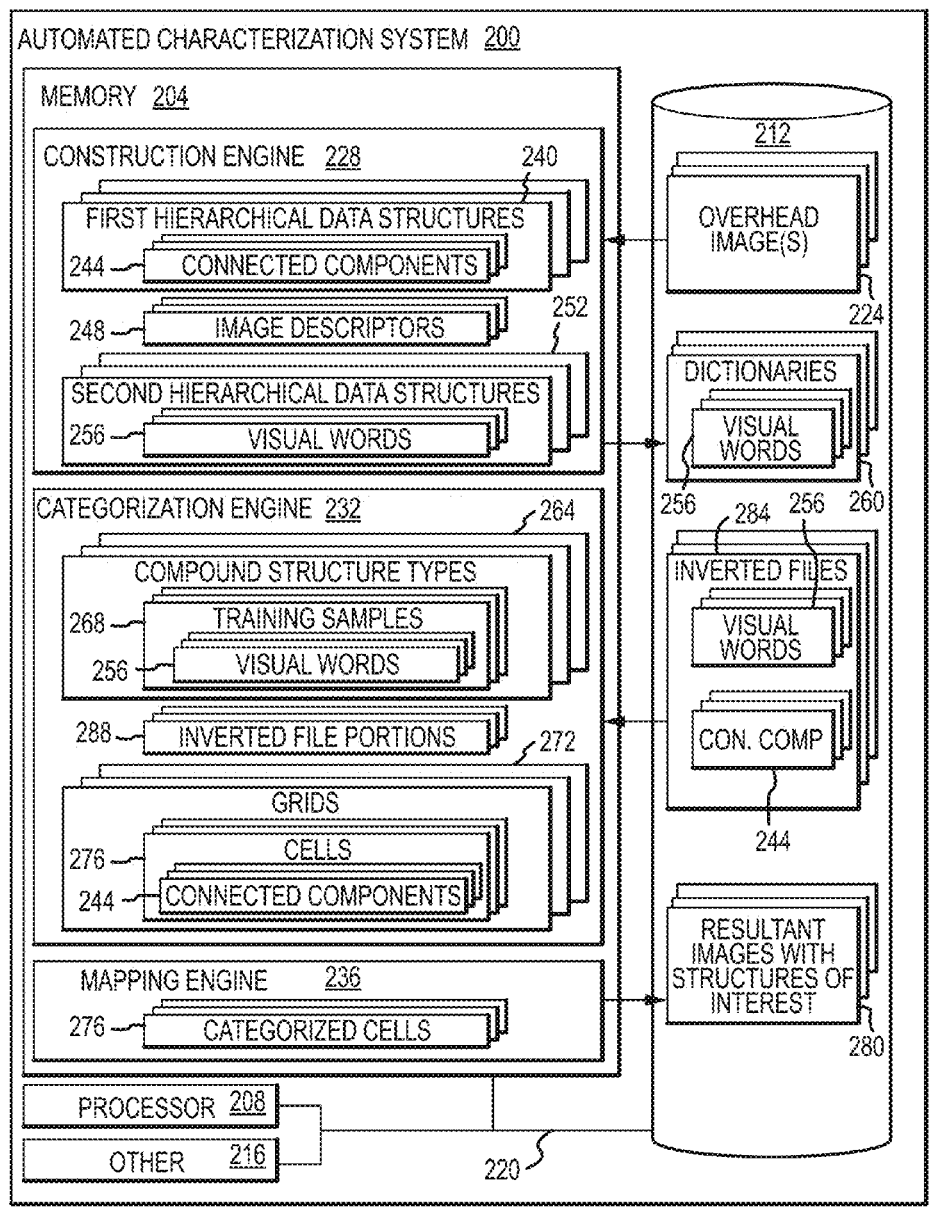
FIG. 2 is a more detailed block diagram of an automated system for characterizing compound structures in overhead imagery data.

Turning now to FIG. 2, a more detailed block diagram of an automated system 200 that may be used to implement the automated visual word dictionary generation 108 and compound structure categorization or characterization 112 in FIG. 1 is presented. Although depicted as a single device (e.g., server, workstation, laptop, desktop, mobile device, and/or other computing device), one or more functionalities, processes or modules of the system 200 may be allocated or divided among a plurality of machines, devices and/or processes which may or may not be embodied in a single housing. In one arrangement, functionalities of the server 200 may be embodied in any appropriate cloud or distributed computing environment.

Broadly, the system 200 may include memory 204 (e.g., one or more RAM or other volatile memory modules, etc.), a processing engine or unit 208 (e.g., one or more CPUs, processors, processor cores, or other similar pieces of hardware) for executing computer readable instructions from the memory 204, storage 212 (e.g., one or more magnetic disks or other non-volatile memory modules or non-transitory computer-readable mediums), and/or a number of other components 216 (e.g., input devices such as a keyboard and mouse, output devices such as a display and speakers, and the like), all of which may be appropriately interconnected by one or more buses 220. While not shown, the system 200 may include any appropriate number and arrangement of interfaces that facilitate interconnection between the one or more buses 220 and the various components of the system 200 as well as with other devices (e.g., network interfaces to allow for communication between the system 200 and other devices over one or more networks, such as LANs, WANs, the Internet, etc.).

The system 200 may appropriately retrieve any one or more overhead images 224 of a geographic area (e.g., from one or more overhead image data sources 104 of FIG. 1, such as the WV2 multispectral image of Rio de Janeiro illustrated in FIG. 13) and store the same in any appropriate form in storage 212 (e.g., such as in one or more databases and manageable by any appropriate database management system (DBMS) to allow the definition, creation, querying, update, and administration of the databases). The processing engine 208 may execute a DBMS or the like to retrieve and load the one or more overhead images 224 into the memory 204 for manipulation by a number of engines or modules of the system 200 as will be discussed in more detail below.

As shown, the system 200 may include a "construction" engine 228 that is broadly configured to construct first and second hierarchical data structures from input overhead images of a geographic area to obtain a dictionary of visual words, a "categorization" engine 232 that is broadly configured to categorize a compound structure type (e.g., residential, urban, orchards, etc.) of the input overhead images based on the visual dictionary, and a "mapping" engine 236 that is broadly configured to generate one or more resultant images of the geographic area depicting the categorized compound structure types in the geographic area. Each of the engines (and/or other engines, modules, logic, etc. disclosed and/or encompassed herein) may be in the form of one or more sets of computer-readable instructions for execution by the processing unit 208 and that may be manipulated by users in any appropriate manner to perform automated characterization of compound structures for presentation on a display (not shown). In this regard, the combination of the processing unit 208, memory 204, and/or storage 212 (i.e., machine/hardware components) on the one hand and the various engines/modules disclosed herein in one embodiment create a new machine that becomes a special purpose computer once it is programmed to perform particular functions of the characterization utilities disclosed herein (e.g., pursuant to instructions from program software).

In one arrangement, any appropriate portal in communication with the various engines may run on the system 200 and be accessible by users (e.g., via any appropriate browser) to access the functionalities of the system 200. While the various engines have been depicted in FIG. 2 as being separate or distinct modules, it is to be understood that the functionalities or instructions of two or more of the engines may actually be integrated as part of the same computer-readable instruction set and that the engines have been depicted in the manner shown in FIG. 2 merely to highlight various functionalities of the system 200. Furthermore, while the engines have been illustrated as being resident within the (e.g., volatile) memory 204 (e.g., for execution by the processing engine 208), it is to be understood that the engines may be stored in (e.g., non-volatile) storage 212 (and/or other non-volatile storage in communication with the system 200) and loaded into the memory 204 as appropriate.

Figure 3:
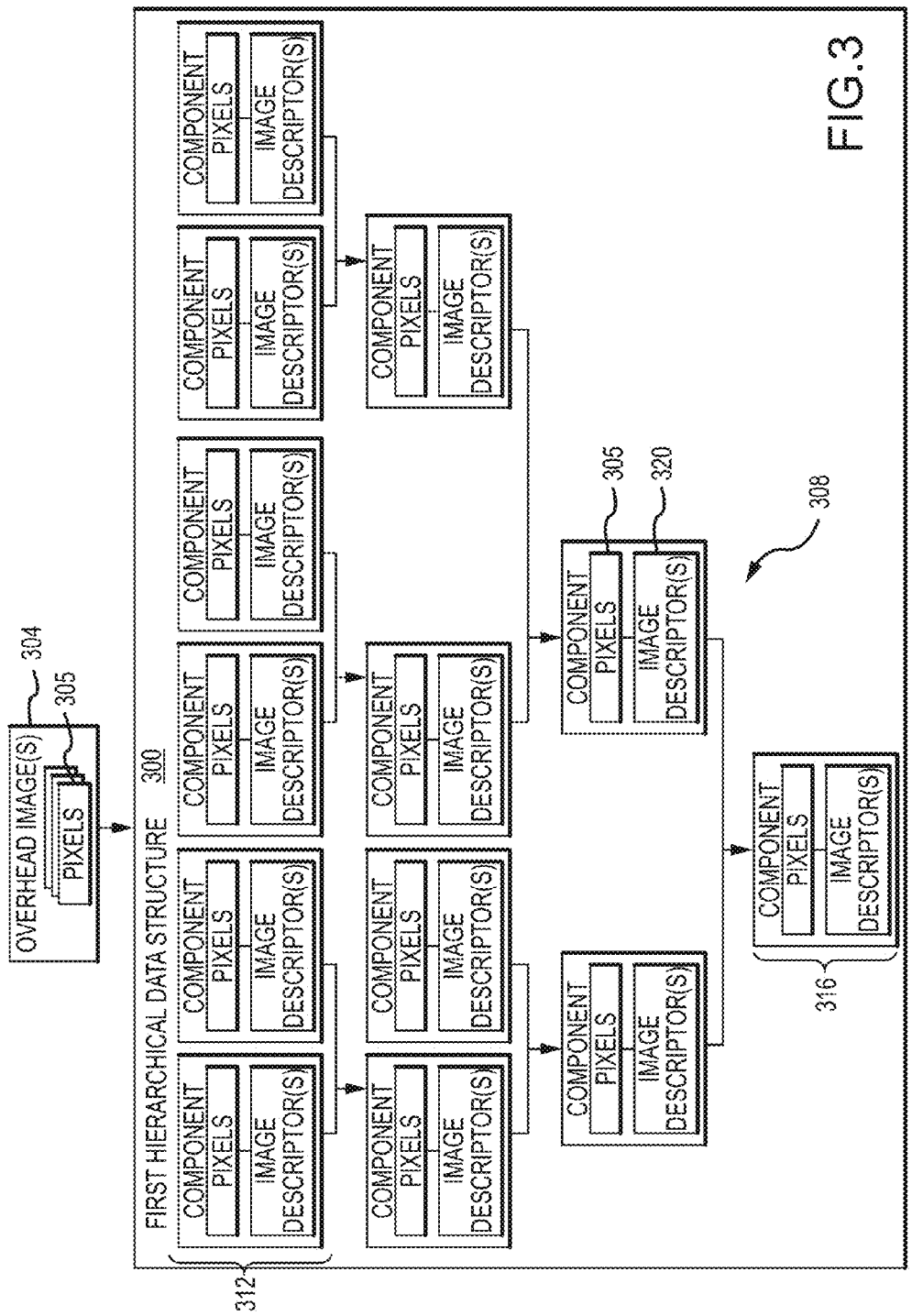
FIG. 3 is a block diagram of a first hierarchical data structure for organizing or clustering pixels of overhead image(s) into connected components.
Figure 4:
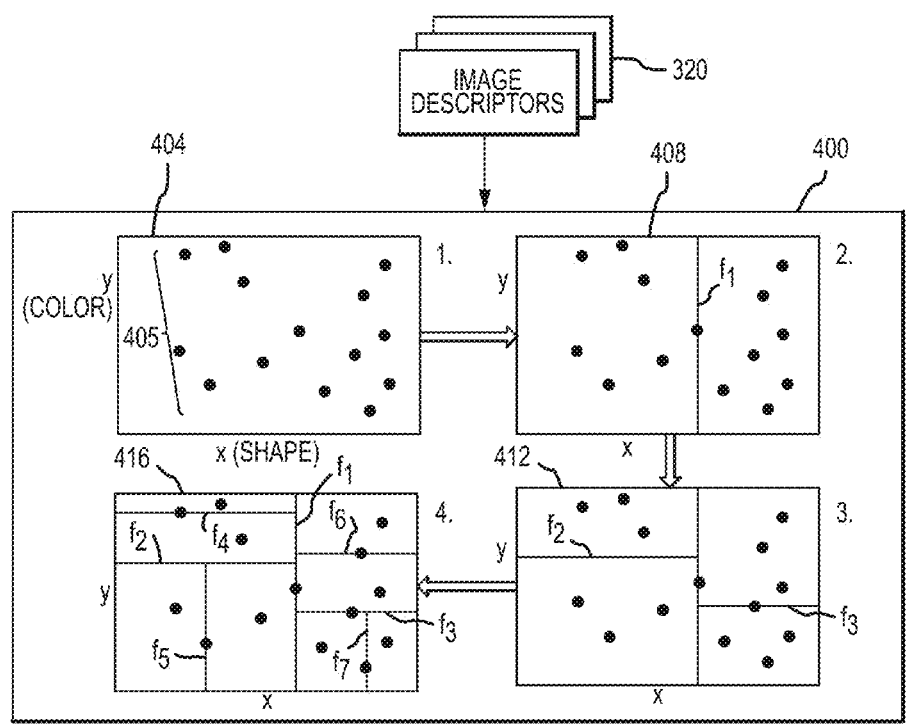
FIG. 4 is a schematic diagram of a space partitioning procedure for use in hierarchically arranging image descriptors of the components of FIG. 3 into a feature space.
Figure 5:
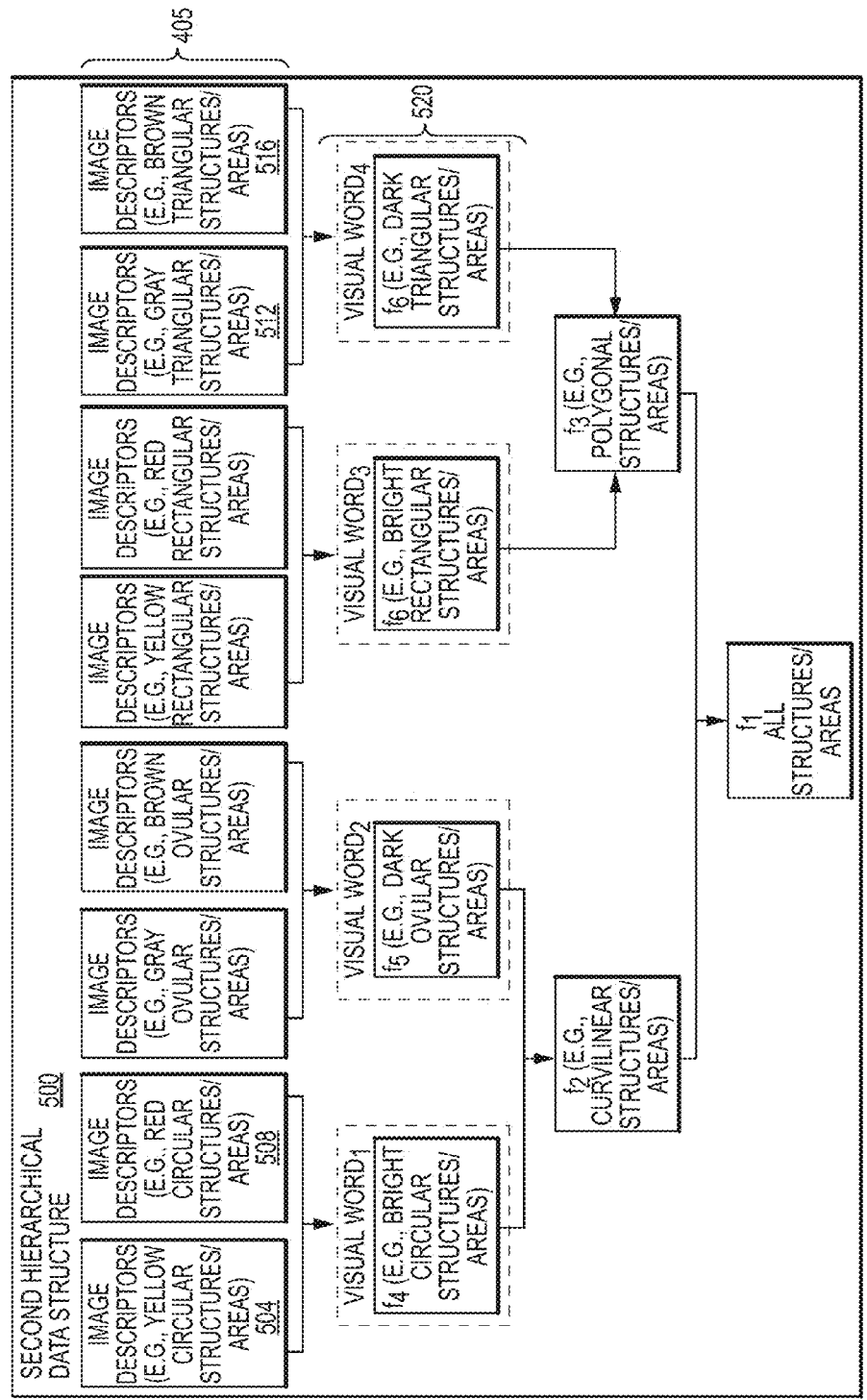
FIG. 5 is a second hierarchical data structure built from the partitioning procedure illustrated in FIG. 4.
Figure 8:
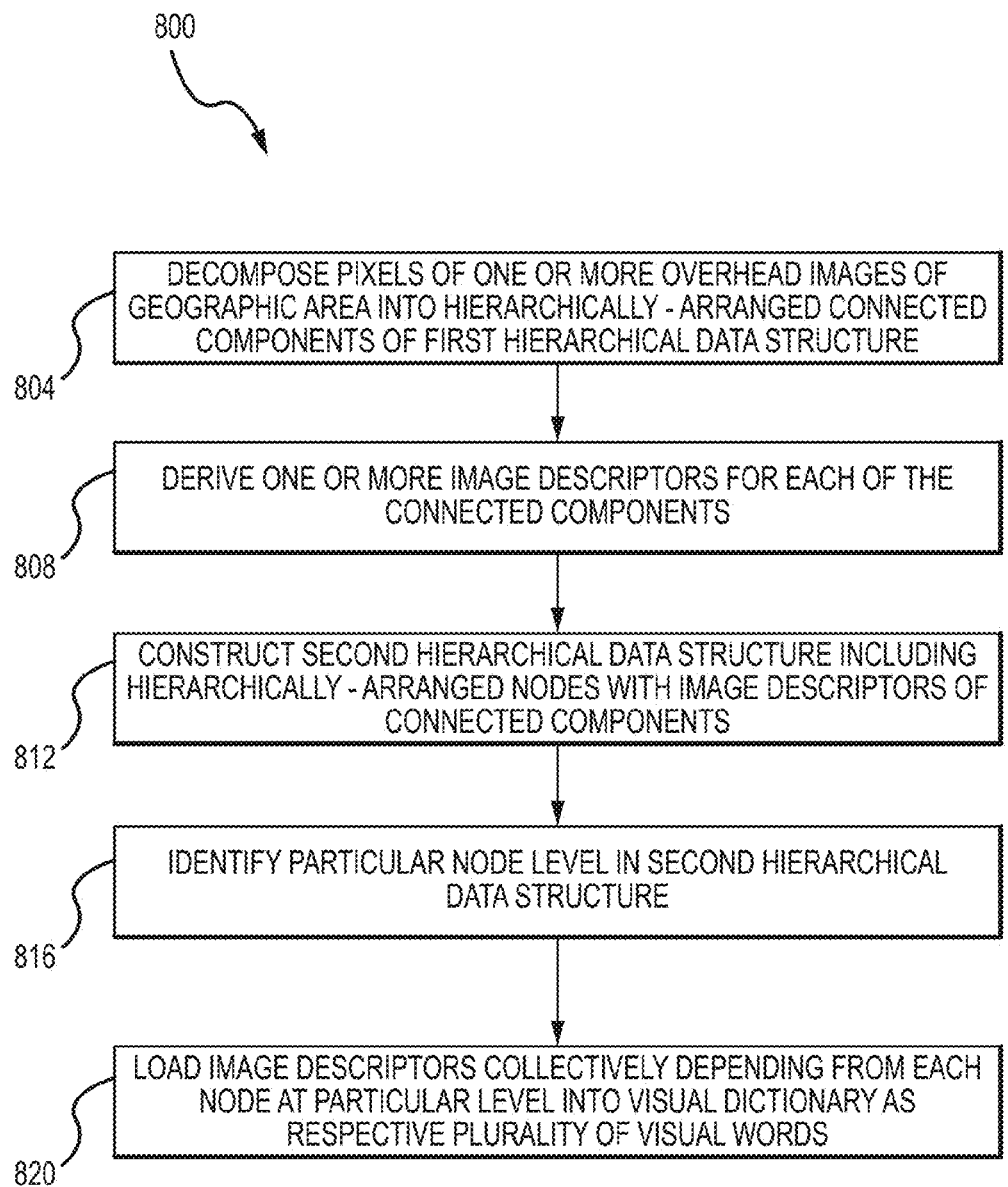
FIG. 8 is a flow diagram of a method for generating a dictionary of visual words that may be used to characterize compound structures in overhead images of a geographic area.

To facilitate the reader's understanding of the various engines of the system 200, additional reference is now made to FIG. 8 which illustrates a method 800 for use in performing the automated characterization processes disclosed herein. Reference is also now made to FIGS. 3, 4, and 5 which respectively illustrate a first hierarchical data structure, a space partitioning procedure for use in hierarchically arranging image descriptors of connected components of FIG. 3 into a feature space, and a resultant second hierarchical data structure constructed by the partitioning procedure illustrated in FIG. 4. While specific steps (and orders of steps) of the method 800 (as well as other methods disclosed herein) have been illustrated and will be discussed, other methods (including more, fewer or different steps than those illustrated) consistent with the teachings presented herein are also envisioned and encompassed within the present disclosure.

The method 800 may begin by decomposing 804 the pixels of one or more input overhead images of a particular geographic area into a plurality of hierarchically connected components (e.g., groups of pixels that collectively define the input image(s) as whole) of a first hierarchical data structure. With reference to FIGS. 2 and 3, for instance, the construction engine 228 of the automated extraction system 200 may receive one or more input overhead images 304 (e.g., overhead images 224) of a particular geographic area (e.g., WorldView 2 multispectral image acquired over a portion of Rio de Janeiro, Brazil illustrated in FIG. 13) and break the input image(s) 304 down into a plurality of connected components 308/244 (e.g., nodes) of a first hierarchical data structure 240/300 (e.g., Min-Tree, Max-Tree, etc.).

In the case of the first hierarchical data structure 300 being in the form of a Max-Tree, for example, the first hierarchical data structure 300 may be a rooted, uni-directed tree with its leaf components 312 (e.g., leaf nodes) corresponding to a regional maxima of the input overhead image(s) 304 and its root component 316 (e.g., root node) corresponding to a single connected component defining the background of the input overhead image(s). For instance, the overhead image(s) 304 may be thresholded at each of a number of intensity or grayscale levels to provide as many binary images as the number of grey levels, where each binary image may then be analyzed to derive its connected components 308. At least one morphological attribute filter (e.g., an edge preserving operator) may progressively accept (or reject) connected components 308 of the tree based on some attribute criterion.

For instance, image descriptor or attribute openings and closings may be used whereby the intensity value (e.g., grayscale) of each connected component 308 is assessed at each of a number of progressively increasing and decreasing predetermined threshold intensity or grayscale levels and the component is rejected if the intensity value is not higher or lower than each respective progressively increasing or decreasing predetermined intensity level. The hierarchical ordering of the components 308 may encode the nesting of peak components (e.g., pixels with intensities greater than a level "h") with respect to the gray-scale range of the input image(s) 304. Each component 308 may generally point to its parent (i.e., the first ancestor node 308 below the given level) while the root component 316 points to itself. While a Max-Tree has been discussed, it is to be understood that many other manners of partitioning the one or more overhead images 224 into a plurality of connected components collectively representing the pixels of the overhead image(s) 224 are also encompassed herein. For instance, a minimum spanning tree defined on the image edges or the tree of shapes (e.g., a merge of a Max-Tree with a Min-Tree) may be utilized whereby pixels of the input overhead image(s) may be hierarchically grouped into components. Such a minimum spanning tree is disclosed in "Fast Computation of a Contrast-Invariant Image Representation" by P. Monasse and F. Guichard as published in Volume 9, Issue 5 of IEEE Transactions on Image Processing in 2000 (doi: 10.1109/83.841532), the entirety of which is incorporated herein by reference as if set forth in full.

The method 800 of FIG. 8 also includes deriving 808 one or more image descriptors 320/248 for each of the connected components 308. For instance, spectral descriptors may be derived by determining the individual satellite image band averages in each component 308 while shape descriptors may be derived such as area, eccentricity, image moments (Hu), and the like of the pixels represented by the component 308. In one embodiment, each component may include a pointer to a data structure that stores auxiliary data for the component, 308, where the construction engine 228 derives or otherwise determines one or more image descriptors 320 for each connected component 308/244 from such auxiliary data. The first hierarchical data structure 300 may thus allow for compact storage of the connected components 308 from all grey levels while having a limited computational complexity. In any case, the first hierarchical data structure 300/240 may be appropriately stored in memory 204 for quick retrieval during subsequent steps of the method 800.

In the case of a multi-spectral image, for instance, the various spectral bands may be fused into a single band in any appropriate manner before the image is decomposed into the first hierarchical data structure. For example, the spectral bands of an 8-band multi-spectral image may be fused into a single band by way of the following built-up (BU) index which may be computed for each pixel of the input image:

$$BU = \frac{RE - NIR2}{RE + NIR2}$$

where "RE" is the intensity of electromagnetic radiation received in the red edge band of the electromagnetic spectrum, and "NIR2" is the intensity of electromagnetic radiation received in the NIR2 band of the electromagnetic spectrum. In this regard, the pixels of the 8-band multispectral image may be broken and arranged into a plurality of hierarchical components based on the respective BU values of the pixels.

As another example, the spectral bands of a 4-band multi-spectral image may be fused into a single band by way of the following built-up (BU) index which may be computed for each pixel of the input image:

$$BU = \frac{R - NIR}{R + NIR}$$

where "R" is the intensity of electromagnetic radiation received in the red band of the electromagnetic spectrum, and "NIR" is the intensity of electromagnetic radiation received in the NIR band of the electromagnetic spectrum. In this regard, the pixels of the 4-band multispectral image may be broken and arranged into a plurality of hierarchical components based on the respective BU values of the pixels. While the above BU indexes have been discussed, almost any meaningful band ratio may be utilized such as Normalized Difference Vegetation Index (NDVI or (NIR−VIS)/(NIR+VIS), Normalized Difference Water Index (NDWI or (Green−NIR)/(Green+NIR)), and/or the like.

As shown in FIG. 8, the method 800 may also include constructing 812, with the derived image descriptors 320/248 of the connected components 308/244, a second hierarchical data structure 252 that includes a plurality of hierarchically-arranged nodes, where each of the image descriptors 320/248 depends from one or more of the nodes, and where the second hierarchical data structure 252 represents an image descriptor space of the first hierarchical data structure 240. Constructed second hierarchical data structure(s) 252 may be appropriately stored in memory 204 for quick retrieval during subsequent steps of the method 800.

In one arrangement, the second hierarchical data structure 252 may be in the form of a KD-Tree and in this regard FIG. 4 illustrates a simplified KD-Tree-based space partitioning procedure 400 that may be used to build the second hierarchical data structure 252. It is to be understood however that that other manners of hierarchically organizing the image descriptor space of the first hierarchical data structure 240 are also encompassed herein (e.g., image descriptor clustering based on dissimilarity measures or the like). As seen in FIG. 4, and in the case of the construction engine 228 deriving first and second image descriptors (e.g., a shape descriptor and a spectral descriptor) for each of the connected components 308/244 (see FIGS. 2-3), the construction engine 228 may initially dispose respective data points 405 (e.g., each representing a fusion or concatenation of the first and second image descriptors) for each of the connected components 308/244 at appropriate locations on an x, y coordinate system as shown in a first step 404 of the procedure 400. As just one example, the x-axis may correspond to the shape of each component 308/244 (e.g., the shape collectively represented by the image pixels making up the component, where for instance, the left side of the x-axis represents more curvilinear shapes and right side represents more polygonal shapes) and the y-axis may correspond to the color of each component 308/244 (e.g., the color collectively represented by the image pixels making up the component, where, for instance, the bottom of the x-axis represents darker colors and the top represents brighter colors).

The construction engine 228 may then create a root node $f_1$ as shown in a second step 408 by splitting the data points 405 into two groups with a vertical line through the median x-coordinate of the data points 405. A similar procedure may then be performed to create child nodes $f_2$, $f_3$, as shown in a third step 412, only with respective horizontal lines through the respective median y-coordinates of the data points 405 on either side of the root node $f_1$. The splitting may then continue recursively to create leaf nodes $f_4$, $f_5$, $f_6$, $f_7$ as shown in a fourth step 416, where one or more data points 405 (e.g., up to a maximum of "m" data points 405 which may be appropriately designated in advance) may depend from each of the leaf nodes $f_4$, $f_5$, $f_6$, $f_7$.

FIG. 5 illustrates a simplified second hierarchical data structure 500 built from the nodes $f_1$-$f_7$ and data points 405 illustrated in the fourth step 416 of FIG. 4. As shown, the second hierarchical data structure 500 includes a plurality of levels of nodes such as one level that includes nodes $f_2$, $f_3$, another level that includes leaf nodes $f_4$, $f_5$, $f_6$, $f_7$, etc. Generally, each data point 405 depends from one of the leaf nodes $f_4$, $f_5$, $f_6$, $f_7$ and each of the nodes $f_1$-$f_7$ collectively includes the image descriptors of all nodes and/or data points 405 depending therefrom. As an example, node $f_4$ includes (e.g., as determined during the partitioning procedure 400 of FIG. 4) all the image descriptors associated with a first data point 504 that includes yellow circular structures and a second data point 508 that includes red circular structures. In this regard, node $f_4$ may generally represent bright colored circular structures/portions. As another example, node $f_7$ includes all the image descriptors associated with a third data point 512 that includes gray triangular structures and a fourth data point 516 that includes brown triangular structures. In this regard, node $f_7$ may generally represent dark colored polygonal structures/portions. While a two-dimensional space partitioning procedure 400 is illustrated in each of the steps of FIG. 4, it is to be understood that more complicated space partitioning procedures may be employed to accommodate more than two dimensions of image descriptors.

Turning back to FIG. 8, the method 800 includes identifying 816 a particular node level in the second hierarchical data structure 500 and then loading 820 an image descriptor category or classification represented by each of the nodes at the particular node level into a visual dictionary as a respective plurality of visual words. For instance, assume that the node level including nodes $f_4$, $f_5$, $f_6$, $f_7$ is selected as the particular node level at which to create the visual dictionary. Also assume that node $f_4$ generally represents bright circular structures/areas, node $f_5$ generally represents dark ovular structures/areas, node $f_6$ generally represents bright rectangular structures/areas, and that node $f_7$ generally represents dark triangular structures/areas, respectively. In this case, the respective image descriptor types encompassed by each of the nodes $f_4$, $f_5$, $f_6$, $f_7$ would become a respective number of visual words 520. For instance, a first visual word 520 ("Visual Word$_1$") would include image descriptors encompassing bright circular structures/areas, a second visual word 520 ("Visual Word$_2$") would include image descriptors encompassing dark ovular structures/areas, a third visual word 520 ("Visual Word$_3$") would include image descriptors encompassing bright rectangular structures/areas, and a second visual word 520 ("Visual Word$_2$") would include image descriptors encompassing dark triangular structures/areas.

The visual words may then be loaded into a visual word dictionary for use by the categorization engine 232 (e.g., see visual words 256 being loaded into visual word dictionary 260 in FIG. 2). Selection of different node levels in the second hierarchical data structure 500/252 creates additional or different visual words at varying levels of granularity. For instance, selecting node levels closer to the root node $f_1$ such as the level including nodes $f_2$, $f_3$ would create two (e.g., coarser) visual words respectively including curvilinear structures (e.g., regardless of color) and polygonal structures (e.g., regardless of color) while selecting node levels (or data points 405) farther away from the root node $f_1$ creates high numbers of finer-grained visual words. Multiple dictionaries 260 including different combinations of visual words can be stored in storage 212 (see FIG. 2) for use in categorizing different types of compound structures at varying granularity levels as will be discussed in more detail below.

Figure 9:
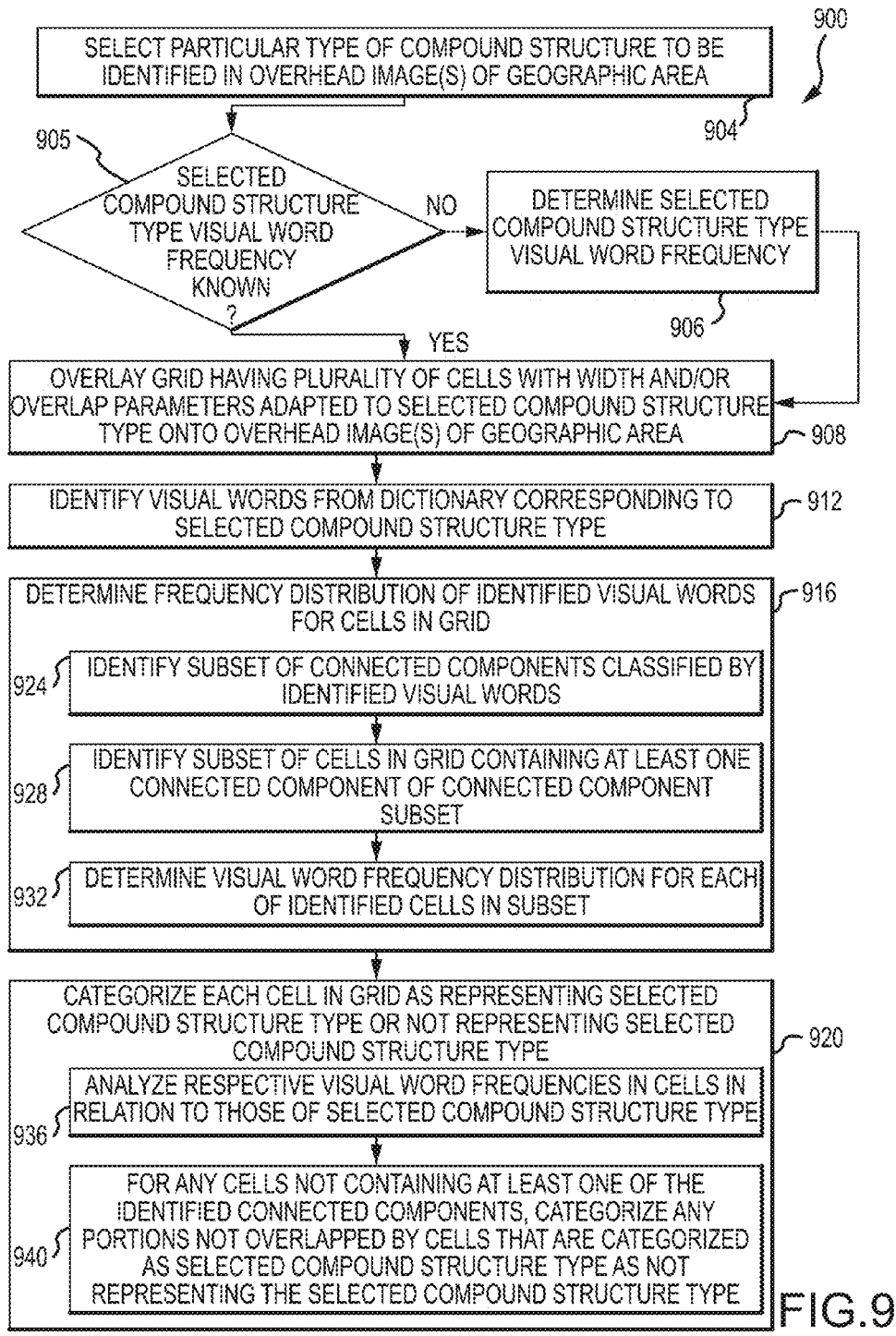
FIG. 9 is a flow diagram of a method for characterizing compound structures in overhead images of a geographic area using a visual dictionary created according to the method of FIG. 8.
Figure 13:
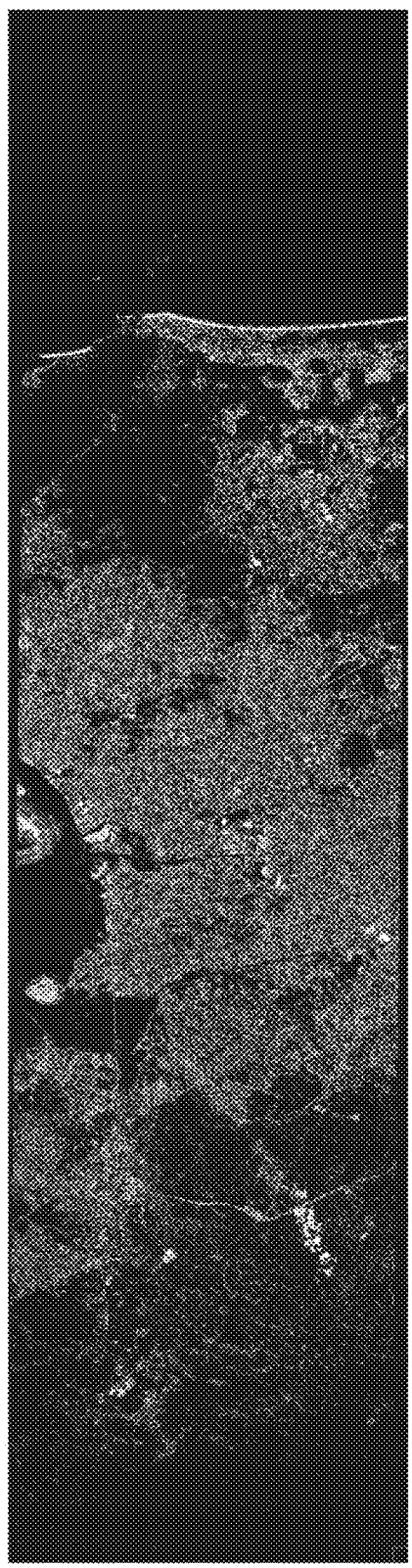
FIG. 13 illustrates a multispectral image acquired by the WorldView 2 satellite over a portion of Rio de Janeiro, Brazil.

In this regard, reference is now made to FIG. 9 which illustrates a flow diagram of a method 900 for characterizing (e.g., categorizing) compound structures in overhead images of a geographic area (e.g., WorldView 2 multispectral image acquired over a portion of Rio de Janeiro, Brazil illustrated in FIG. 13) using a visual word dictionary, such as one or more visual word dictionaries 260 created according to the method 800 of FIG. 8. At 904, a particular type of compound structure to be identified (e.g., built-up, orchards, forests, etc.; finer granularities of built-up such as urban, residential, and informal settlements, etc.; and/or the like) in the one or more overhead images of the geographic area decomposed in the method 800 of FIG. 8 may be selected. It may then be queried 905 whether a frequency or prevalence of at least some of the visual words for the selected compound structure type (e.g., a compound structure type visual word signature) is known. In response to a positive answer to the query at 905, the method may proceed to overlay 908 a grid of cells onto the overhead image(s) of the geographic area for use in categorizing one or more compound structure types in the geographic area as will be discussed in more detail below.

Figure 12:
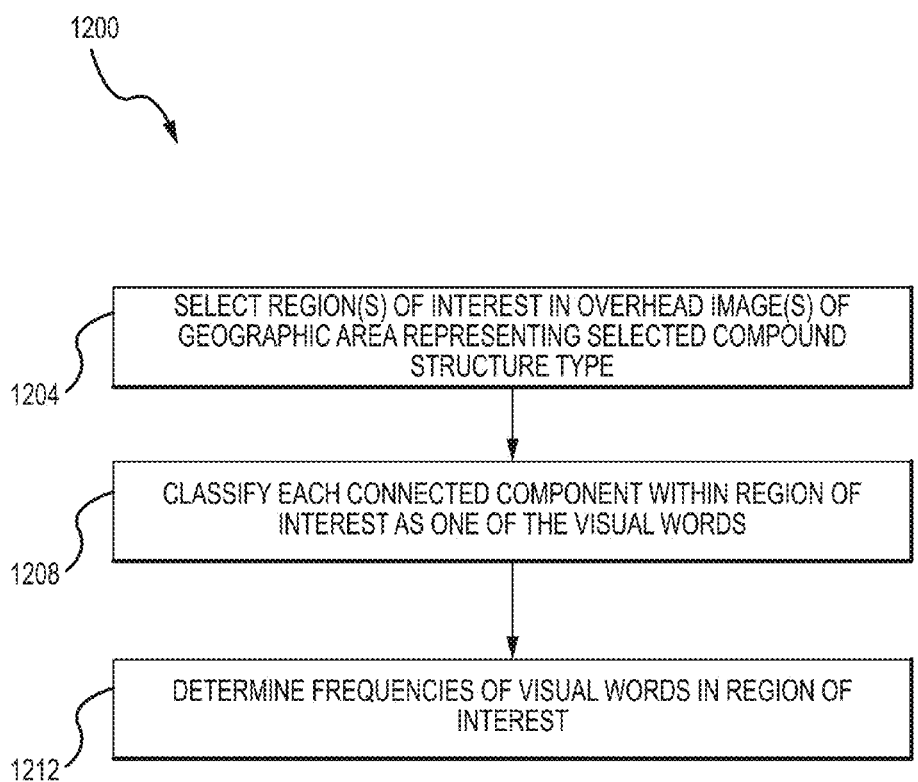
FIG. 12 is a flow diagram of a method for identifying visual frequencies within training samples.
Figure 14:
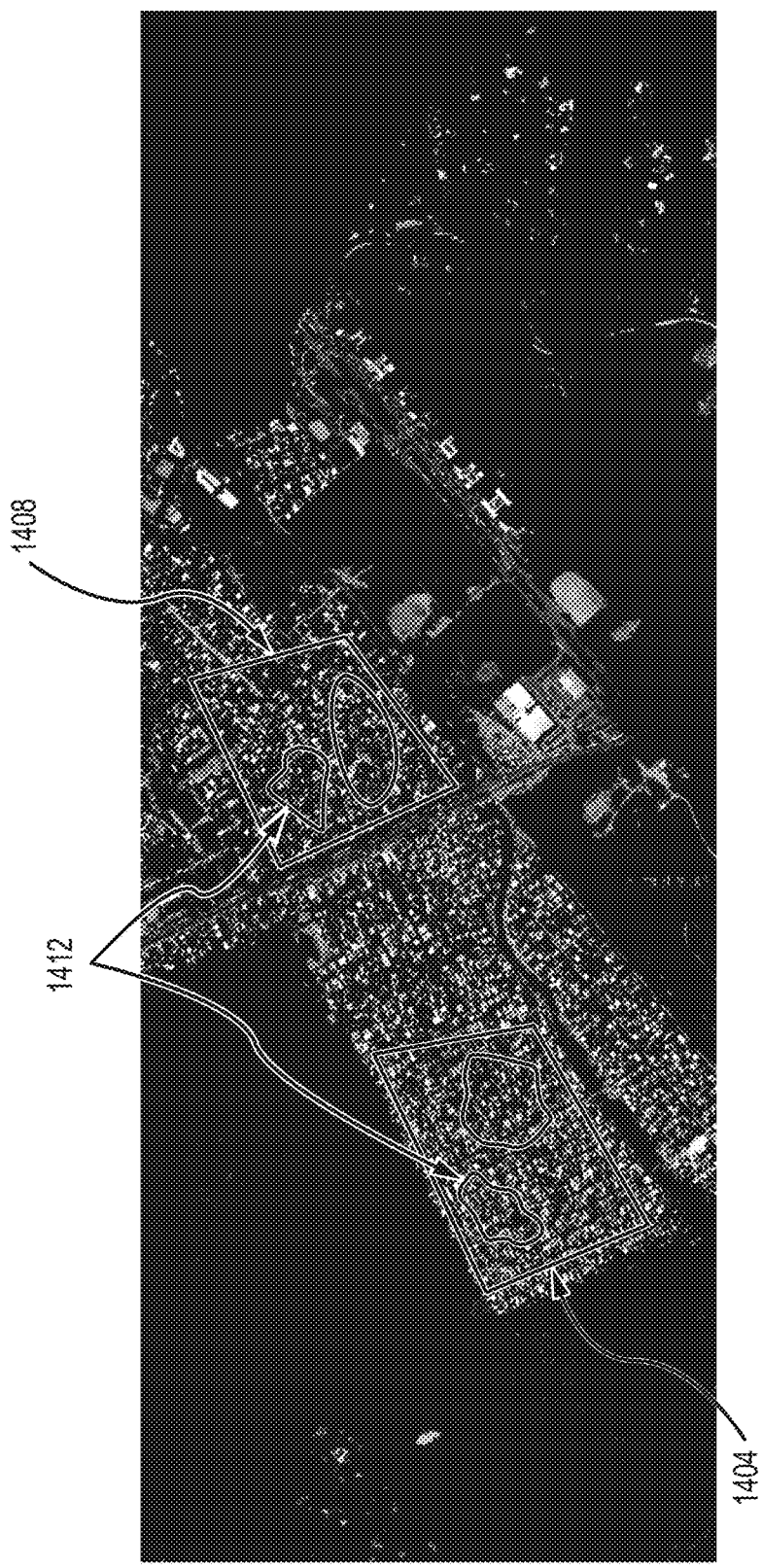
FIG. 14 illustrates training samples selected for use in detecting a first compound structure type in the multispectral image of FIG. 13.
Figure 15:
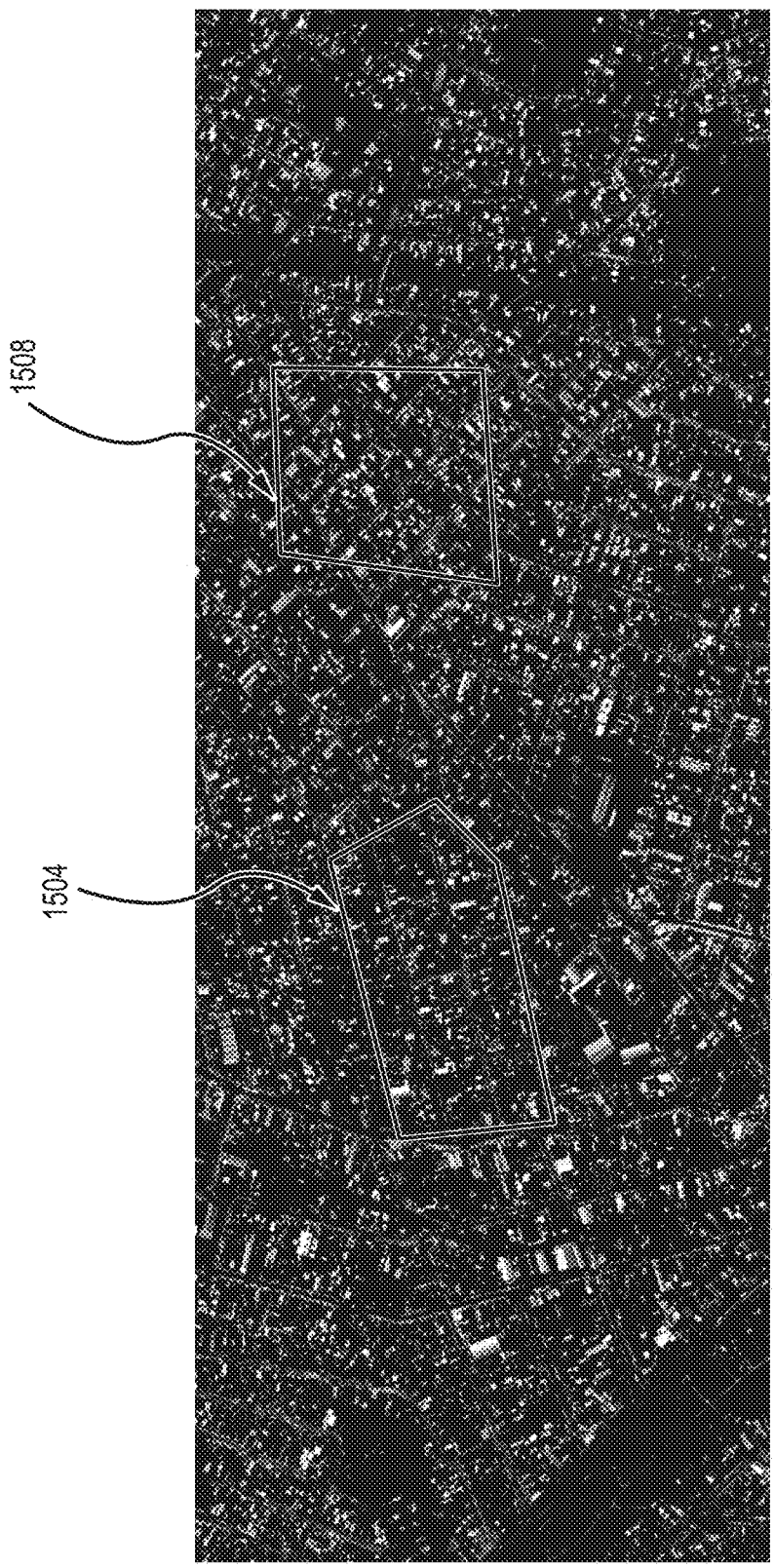
FIG. 15 illustrates training samples selected for use in detecting a second compound structure type in the multispectral image of FIG. 13.
Figure 16:
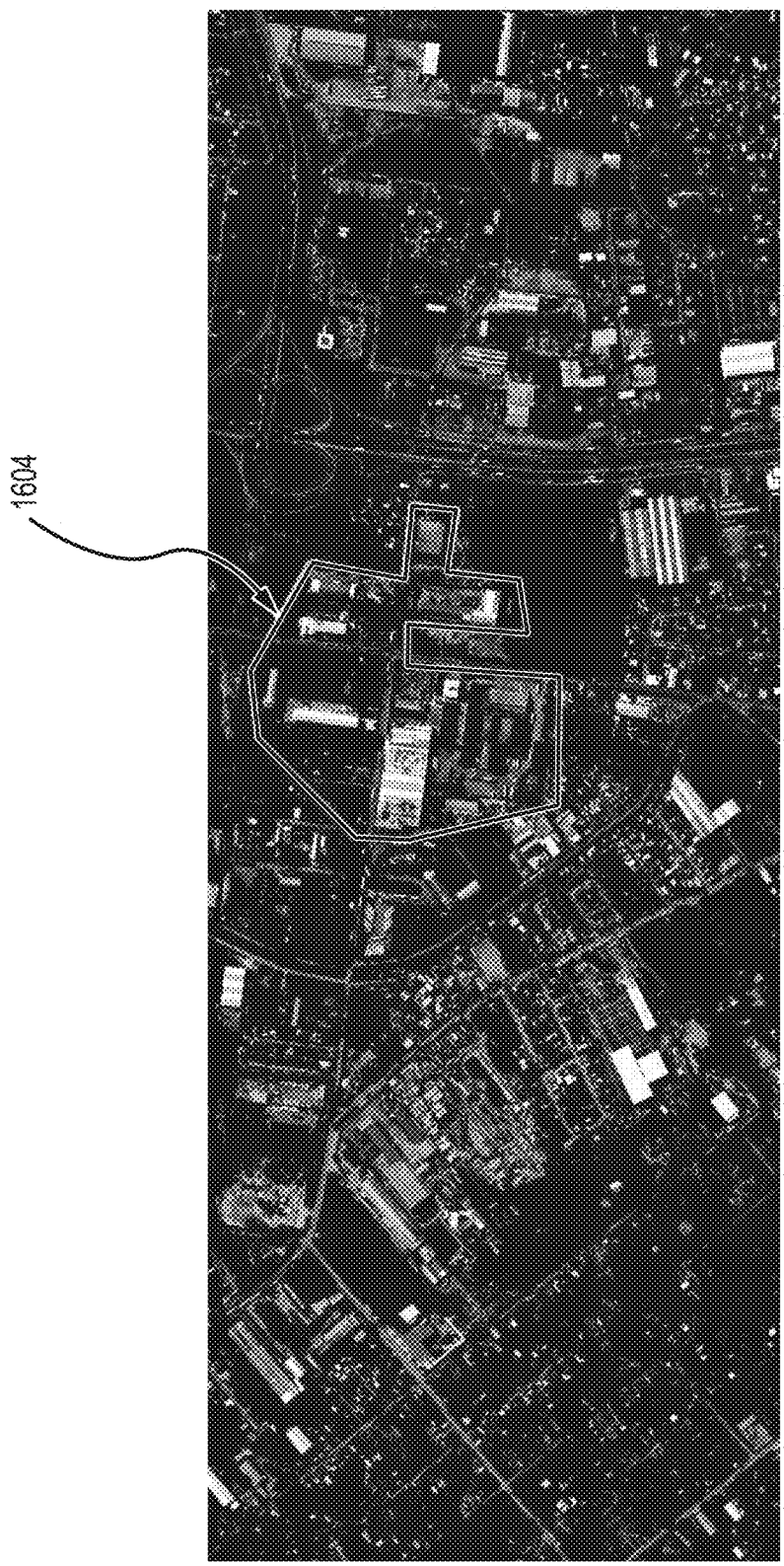
FIG. 16 illustrates training samples selected for use in detecting a third compound structure type in the multispectral image of FIG. 13.

Before discussing step 908 and subsequent steps in more detail, the method 900 may, in response to a negative answer to the query at 905, proceed to determine 906 the selected compound type visual word frequency/prevalence for use in the categorization of unknown portions of the geographic area. Turning now to the method 1200 of FIG. 12, at least one training sample or region of interest (ROI) in the overhead image(s) of the geographic area that represents that selected compound structure type may be selected 1204. In the case of the overhead image of Rio de Janeiro, Brazil illustrated in FIG. 13, for instance, FIG. 14 illustrates the selection of first and second regions of interest 1404, 1408 (e.g., via a user interface in any appropriate manner) representing selected compound structure types in the form of informal settlements (e.g., slums) in the overhead image of FIG. 13. As further examples, FIGS. 15 and 16 illustrate the selection of additional ROIs 1504, 1508 and 1604, respectively, for other selected compound structure types (e.g., residential and industrial, respectively). The method 1200 may then classify 1208 each connected component (e.g., connected components 244/308 of FIGS. 2-3) resident within the selected ROI as one of the visual words (e.g., visual words 256 of dictionary(ies) 260 in FIG. 2; visual words 520 in FIG. 5).

Figure 11:
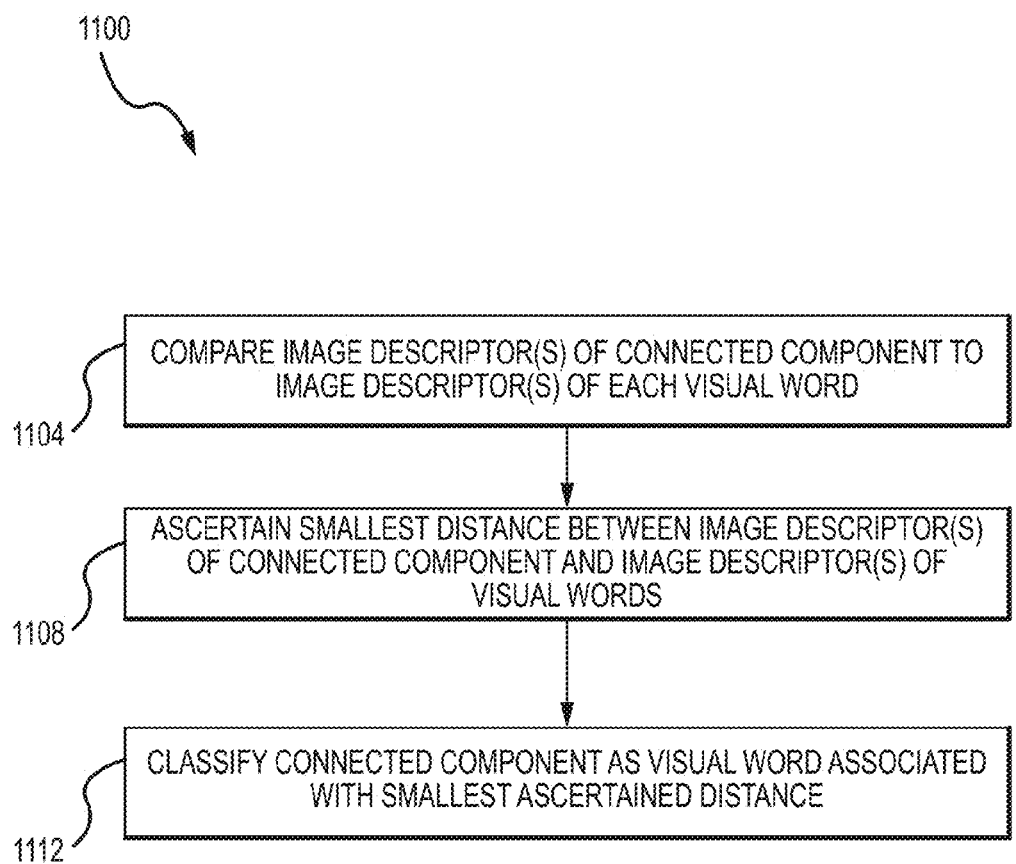
FIG. 11 is a flow diagram of a method for classifying connected components as one of a plurality of visual words in a dictionary.

With brief reference now to the method 1100 of FIG. 11, the one or more image descriptors of each connected component may be initially compared 1104 and/or otherwise analyzed in relation to the one or more image descriptors of each visual word. For instance, each of the first and second ROIs 1404, 1408 in FIG. 14 may include one or more connected components 1412 therein, each of which includes or is described by one or more image descriptors (e.g., image descriptors 248 in FIGS. 2 and 320 in FIG. 3). For each connected component, the method 1100 may then include ascertaining 1108 a smallest distance (e.g., via a dissimilarity analysis or the like) between the image descriptor(s) of the connected component and the image descriptor(s) of each of the visual words and then classifying 1112 the connected component as the visual word associated with the smallest ascertained distance. For example, assume that the visual words included the four visual words 520 of FIG. 5. In the case where the image descriptor(s) of one of the connected components 1112 included bright green, somewhat square or rectangular structures, for instance, the connected component 1112 may be classified as Visual Word$_3$ 520 of FIG. 5. A similar process may be performed to classify the other connected components within the selected ROIs as one of the visual words.

Returning to FIG. 12, the method 1200 may then include determining 1212 the frequencies of the visual words within the one or more ROIs corresponding to the selected compound structure type, such as by analyzing the visual word classification of the connected components within the one or more ROIs for the selected compound structure type. For instance, a histogram including the frequencies of each of the visual words within the one or more ROIs may be expressed in the form of the following vector x:

$$x_i = [a_1(\text{Visual Word}_1), a_2(\text{Visual Word}_2), a_3(\text{Visual Word}_3), a_4(\text{Visual Word}_4), \ldots a_n(\text{Visual Word}_n)],$$

where each of the entries $a_1$, $a_2$, etc. corresponds to the frequency of a respective one of the visual words within the spatial extent of the one or more ROIs.

For instance, each time one of the connected components 1412 within the first and second ROIs 1404, 1408 is classified as one of the visual words, the frequency entry for the respective visual word may be increased in the vector x for the selected compound structure type. A similar process may be performed to obtain visual word frequency vectors x for other compound structure types, such as those corresponding to the ROIs in FIGS. 15 and 16, where the considered visual words may be the same as or different than those considered in relation to other compound structure type ROIs (e.g., from different visual dictionaries 260 constructed from visual words 256). The categorization engine 232 may maintain or at least have access to any appropriate data structures (e.g., in memory 204 and/or in storage 212) including compound structure types 264, respective training samples 268 (e.g., ROIs), visual words 256 (and their respective frequencies), and/or the like.

Figure 6:
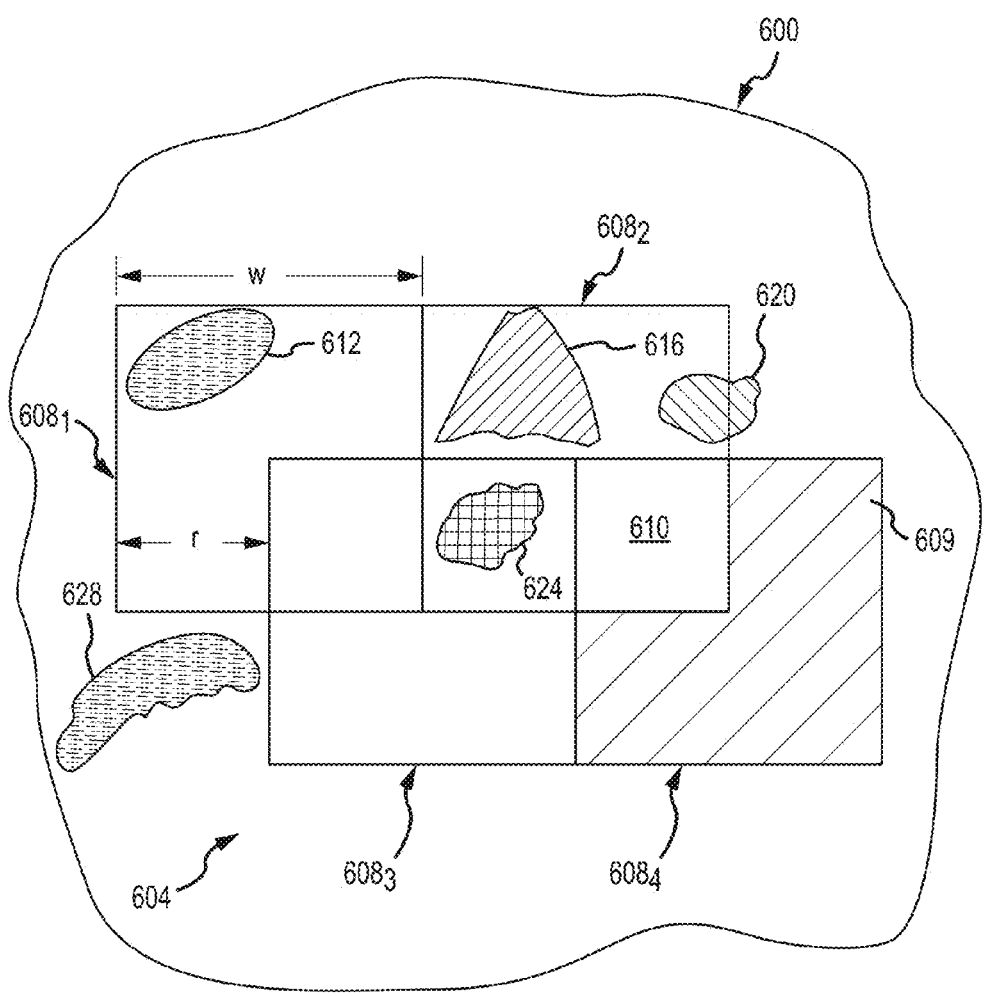
FIG. 6 is a schematic diagram of a portion of a grid being overlaid onto one or more overhead images of a geographic area and illustrating connected components within the grid.

With reference back to FIG. 9, the method 900 may include overlaying 908 a grid having a plurality of adjacent cells (e.g., tiles, such as square-shaped tiles) onto the overhead image of the geographic area, where compound structure type of each cell is to be categorized as will be discussed in more detail below. With reference to FIG. 6, for instance, a portion of one or more overhead images of a geographic area 600 (e.g., the overhead image of Rio de Janeiro, Brazil illustrated in FIG. 13) is presented, where a portion of a grid 604 including a plurality of cells $608_1$, $608_2$, $608_3$, $608_4$ is disposed thereover. The grid 604 may include a number of parameters that define the size of the cells as well as the orientation of the cells relative to adjacent cells.

One parameter may be a width parameter w that generally defines a width of each of the cells and may correspond to the spatial extent of the selected compound structure type or semantic (e.g., of step 904 of FIG. 9) to increase the descriptive power of the visual words frequencies within the cells. For instance, the semantic or compound structure "destroyed building" may be best described by finding rubble pieces (e.g., identified by a particular combination of visual word frequencies) within a spatial extent which is about that of a building scale, such as 10 meters, while the semantic or compound structure "orchard" may be best described by finding trees within a spatial extent which has the dimension of a field greater than about 100 meters. In this case, a first grid could be created having cells with width parameters w of 10 meters to identify destroyed buildings and a second grid could be created having cells with width parameters w of 100 meters to identify orchards. The first and second grids may both be overlaid onto the overhead image(s) of the geographic area to automatically and/or simultaneously detect destroyed buildings and orchards within the overhead image(s) of the geographic area as disclosed herein.

Another parameter may be an overlap parameter r that generally defines a vertical and/or horizontal displacement between successive or adjacent cells and thus controls the number of cells produced (e.g., where r may be the same or different in the vertical and horizontal directions). For instance, the overlap parameter r may be defined between left edges of adjacent cells, such as between the left edges of cells $608_1$, and $608_3$ in FIG. 6. In this regard, a smaller overlap parameter r would result in a greater number of cells and thus a higher sampling resolution of the geographic area 600. As another example, the overlap parameter r may be defined between the left edge of cell $608_3$ and the right edge of cell $608_3$ in FIG. 6 such that a smaller overlap parameter would result in a reduced number of cells. In any event, the overlap parameter r may be selected to be a constant fraction of the width parameter w to provide sufficient spatial sampling for the spatial representation of the considered or selected compound structure type. The categorization engine 232 may maintain or at least have access to any appropriate data structures (e.g., in memory 204 and/or in storage 212) including a plurality of grids 272 (e.g., each configured for detecting a different type of compound structure in the overhead image(s) 224 of the geographic area), where each includes a plurality of cells 276 defined by one or more parameters (e.g., width parameters w, overlap parameter r, and/or the like). See FIG. 2.

Referring again to FIG. 9, the method 900 includes identifying 912 visual words 260 from a dictionary 256 (see FIG. 2) corresponding to the selected compound structure type. Stated differently, the method 900 may include identifying 912 visual words analyzed during the determining step 906 in relation to the selected compound structure type. In one arrangement, the method 900 may identify all of the visual words analyzed during the determining step 906. In another arrangement, however, the method 900 may identify a subset I of all of the visual words considered during the determining step 906 or a subset of all of the words in the dictionary. More particularly, many or most compound structure types can be described or identified by less than all of the visual words 260 in the particular dictionary 256 under consideration. That is, the presence, absence, and/or prevalency of some visual words in a dictionary may be more important or revealing than are other visual words as to whether or not a particular compounds structure type is present within or otherwise represented by a particular portion of a geographic area (e.g., within a particular cell of the geographic area).

In one arrangement, a feature selection technique may be used to infer the visual word subset I by aiming to identify the relevant attribute (e.g., relevant visual words) for the particular compound structure type while limiting redundancy therebetween. Among the various feature selection paradigm, filtering methods may use a fast proxy measure to score a feature subset. For instance, a common proxy measure may include the Mutual Information and the Pearson correlation coefficient. A simple but yet effective method may include ranking all of the visual word frequencies with respect to the classes based on their Pearson's correlation. The visual words which have an absolute correlation above a given threshold may be retained to be part of the subset I.

In another arrangement, a fixed percentage of the highest frequency visual words in the one or more ROIs for the selected compound structure type (from step 1212 of FIG. 12) may be retained and identified in step 912 of FIG. 9. In the event that subsequent compound structure type categorizations are inaccurate or otherwise imprecise, a user may be able to incrementally select greater and greater percentages of visual words from the ROI to obtain a result of any desired accuracy with any acceptable level of computational speed. In a further arrangement, any visual words whose respective frequencies only nominally change between ROIs of different compound structure types may be not included in the visual word subset I, or included but afforded less importance than other visual words in the subset I (e.g., via respective weighting values).

Again with reference to FIG. 9, the method 900 may include determining 916, for each cell 276 in the particular grid 272 for the selected compound structure type, a frequency distribution of the identified 912 visual words (e.g., visual word subset I) and then categorizing 920 the cells 276 as either representing or not representing the selected compound structure type (e.g., based on the determined cell visual word frequency distributions and those of the selected compound structure type). In one arrangement, the determining 916 may include classifying all connected components 280 (see FIG. 2) that fall within each respective cell 276 in the particular grid 272 as one of the identified 912 visual words (e.g., via the method 1100 of FIG. 11) and then determining the frequencies of each of the identified 912 visual words within the cell (e.g., where a connected component covering half of a cell would contribute more to its respective visual word's "frequency" within the cell than would another connected component covering only ten percent of the cell).

In another arrangement, the determining 916 may include identifying 924 a subset of connected components 244 in the grid 280 that are classified by a visual word of the identified 912 visual words and then identifying 928 a subset of cells 276 in the grid 272 that fully contain at least one of the identified 924 connected components 244 (e.g., rather than connected components that are cut into two parts by adjacent cells 276). That is, rather than necessarily considering all of the cells 276 in the grid 272, only a subset of the cells 276 that fully contain a connected component classified by one of the identified 912 visual words may be considered. This arrangement advantageously reduces the computational complexity of the categorization processes disclosed herein by avoiding application of the visual word frequency analysis to connected components not classified by one of the identified 912 visual words in the first place as well as limiting what may be arbitrary cuts through connected components 244. In one variation, the identifying step 924 may be limited to lower level sets of the connected components 244 of the first hierarchical data structure 300 as such connected components may be more likely to identify "salient" or important structures/portions in the geographic area.

For all cells identified at 928, the visual word frequency distribution of each such cell may be determined 932. For each identified cell 928 for instance, a histogram including the frequencies of each of the identified 912 visual words within the cell may be expressed in the form of the following vector y:

$$y_i = [b_1(\text{Identified Visual Word}_1), b_2(\text{Identified Visual Word}_2), \ldots b_n(\text{Identified Visual Word}_n)],$$

where each of the entries $b_1$, $b_2$, etc. corresponds to the frequency of a respective one of the identified 912 visual words within the spatial extent of the respective identified 928 cell.

With reference to FIG. 6, for instance, a plurality of connected components 612, 616, 620, 624, 628 (e.g., connected components 244) are respectively disposed over the geographic area 600 and have various shape and spectral parameters as respectively depicted by the outline of the connected components and the hashing of the connected components. Assume that all of the connected components 612, 616, 620, 624, 628 were identified 924 as being classified by one of the identified 912 visual words for the selected 904 compound structure type (where any additional connected components not classified by one of the identified 912 visual words have not been shown in the interest of clarity). However, assume that only cells $608_1$, $608_2$, $608_3$ are identified 928 as containing (e.g., fully) one of the identified 924 connected components.

In this regard, the visual word frequency vectors y may be automatically determined 932 for each of cells $608_1$, $608_2$, $608_3$ using the connected components contained fully therein as well as visual words by which the components have been classified. For instance, assume that Visual Word$_1$, Visual Word$_2$ and Visual Word$_4$ in FIG. 5 were identified 912 as representing the selected 904 compound structure type. In this case, the visual word frequency vector for each of cells 608$_1$, 608$_2$, 608$_3$ may be expressed as follows:

$$y_i = [b_1(\text{Visual Word}_1), b_2(\text{Visual Word}_2), b_4(\text{Visual Word}_4)]$$

In the case of cell 608$_2$, for instance, its vector y may be determined using connected components 616 and 624. For instance, assume that connected component 616 was classified as Visual Word$_4$ of FIG. 5 and that connected component 624 was classified as Visual Word$_1$ of FIG. 5. Here, the frequency vector for cell 608$_2$ may be expressed as follows:

$$y_{608_2} = [12, 0, 30],$$

where one or more connected components (in this case one connected component) classified as Visual Word$_1$ have a frequency of about 12% in cell 608$_2$ (e.g., consume an area that is about 12% of the area of cell 608$_2$), no connected components are classified as Visual Word$_2$, and one or more connected components (in this case one connected component) classified as Visual Word$_4$ have a frequency of about 30% in cell 608$_2$ (e.g., consume an area that is about 30% of the area of cell 608$_2$). Vectors y may be similarly determined for cells 608$_1$ and 608$_3$. In this example, it can be seen how connected component 624 may contribute to each of the visual word frequency vectors of cells 608$_2$, 608$_3$.

Again with reference to FIGS. 2 and 9, the method 900 may then include categorizing 920 each cell 276 in the grid 272 as representing or not representing the selected 904 compound structure type. As shown, the method 900 may include analyzing 936 the determined visual word frequencies (e.g., the respective frequency vectors) of the identified 928 cells in relation to the visual word frequencies of the selected compound structure type (e.g., those determined at step 1212 in FIG. 12). In one arrangement, the categorization engine 232 may compare each respective visual word frequency of each of the identified cells 928 to the corresponding visual word frequency of the selected compound structure type to determine whether the two frequencies are "close enough" (e.g., whether a distance between two frequencies is small enough). Strictly for purposes of example, and in the event that the frequency vector of the identified 912 visual words for the selected compound structure type included the entries 30, 10, 0 (corresponding to Visual Word$_1$, Visual Word$_2$ and Visual Word$_4$ in FIG. 5) while that of cell 608$_2$ included the entries 12, 0, 30 as discussed above (strictly for example), the categorization engine 232 may determine that cell 608$_2$ does not represent the selected compound structure type as each entry in the vector for cell 608$_2$ may be determined to not be close enough to the respective entry in the vector for the selected compound structure type (e.g., via any appropriate dissimilarity analysis or the like). However, entries of 25, 5, 5 in the frequency vector for cell 608$_2$ may be determined to be close enough and thus categorize cell 608$_2$ as representing the selected compound structure type (e.g., urban, orchard, field, etc.).

Figure 10:
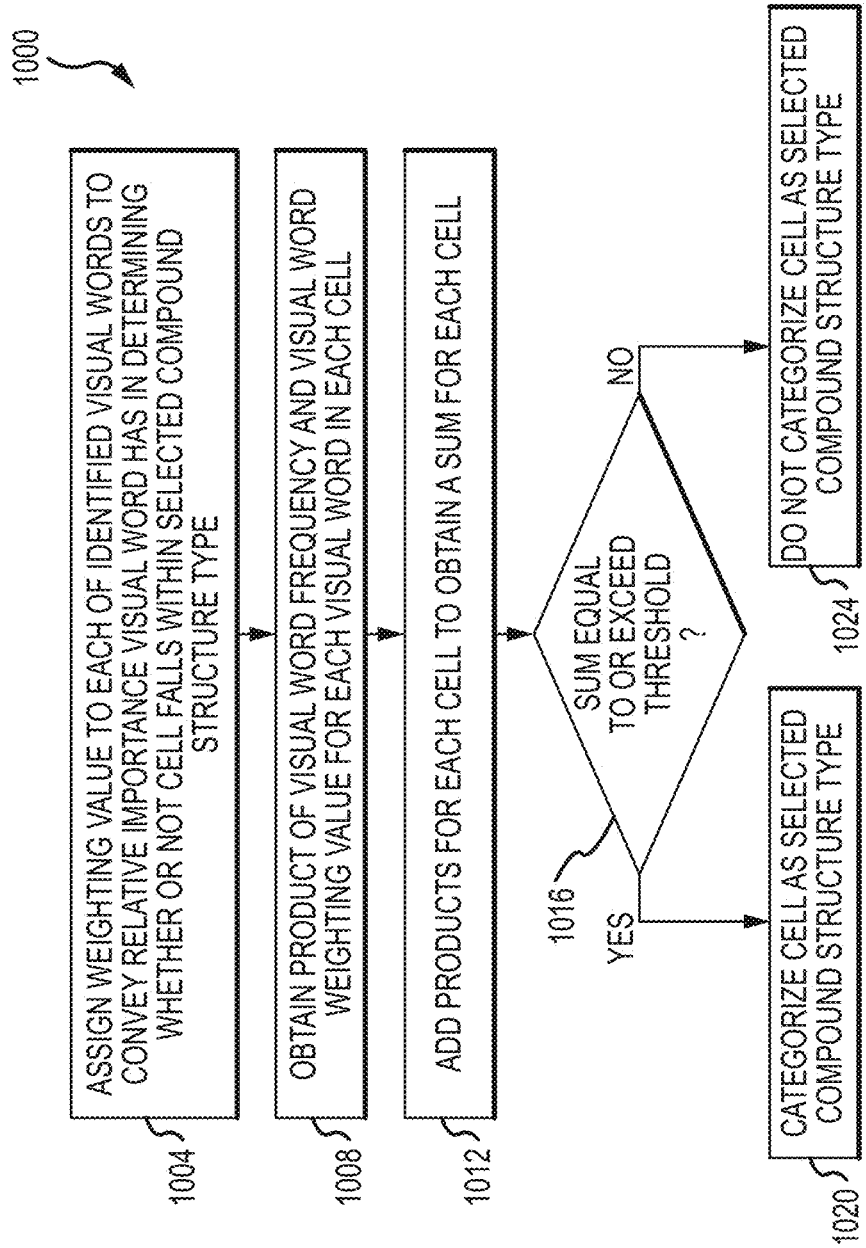
FIG. 10 is a flow diagram of a variation of the method of FIG. 9.

In another arrangement, the categorization engine 232 may train any appropriate linear classifier to make a decision about whether or not the cells 276 in the grid 272 are to be categorized as the selected compound structure type. Turning now to FIG. 10, a categorization method 1000 may include assigning 1004 weighting values to each of the identified 912 visual words (from FIG. 9) to convey a relative importance each visual word has in determining whether or not a particular cell falls within the selected 904 compound structure type. With reference back to the method 1200 of FIG. 12, the selecting 1204 step may additionally include selecting ROIs that do not represent the selected compound structure type (i.e., negative examples of the selected compound structure type) and then additionally performing the classifying 1208 and determining 1212 steps in relation to the negative ROI examples. In one arrangement, the visual word frequency vectors x of all of the ROIs may need to be normalized as the ROIs may be of different shapes and/or sizes. For instance, the frequency vectors x can be normalized by dividing each visual word frequency vector by the area of its respective ROI.

The normalized visual word frequency vectors can then be associated with or labeled as positive or negative examples of the selected compound structure type (where any ROIs labeled as negative examples of the selected compound structure type may also be positive examples of other selected compound structure types). The categorization engine 232 may then use the normalized visual word frequency vectors to train a linear classifier to output a weighting value for each of the visual words that conveys a relative importance the visual word has in determining whether or not a particular cell 276 falls within the selected compound structure type, and output a threshold to be used to categorize the cells 276 as falling within or not falling within the compound structure type as discussed below.

For instance, a weighting vector of the weighting values may be expressed as follows:

$$w_i = [c_1(\text{Visual Word}_1), c_2(\text{Visual Word}_2), \ldots c_n(\text{Visual Word}_n)],$$

where each of the entries $c_1$, $c_2$, etc. corresponds to the weighting value or factor corresponding to each of the visual words.

The method 1000 of FIG. 10 may then include obtaining 1008, for each cell, a product of each visual word frequency and its respective weighting value, adding 1012 the products for each cell, and then querying 1016 whether each sum is equal to or above a threshold t. A cell may be categorized 1020 as the selected compound structure type in response to a positive answer to the query 1016 and may be categorized 1024 as not (e.g., other than) the selected compound structure type in response to a positive answer to the query 1016.

In the case of cell 608$_2$ of FIG. 6, for instance, the steps 1008, 1012 and query 1016 may be expressed as follows:

If $[b1(\text{Visual Word1}) \quad b2(\text{Visual Word2}) \quad b4(\text{Visual Word4})] \times \begin{bmatrix} c1(\text{Visual Word1}) \\ c2(\text{Visual Word2}) \\ c4(\text{Visual Word4}) \end{bmatrix} \geq t,$ then cell = 1 (selected compound structure type);

Otherwise cell = 0 (not selected compound structure type)

Stated differently, the dot product of a) the visual word frequency vector of a cell (where the entries correspond to the identified 912 words, such as a subset of all visual words as discussed above) and b) the weighting vector that includes weighting value entries corresponding to the visual words in the visual word frequency vector may be obtained and then compared to the threshold t to determine whether or not to categorize the cell as one of two classes: a first class that includes the selected compound structure type or a second class that includes all other compound structure types. While the expression has been discussed in the context of categorizing the cell as falling within the selected compound structure when the dot product is equal to or above the threshold, other embodiments envision doing so when the dot product is below the threshold, or equal to or below the threshold. A similar process may be performed to categorize other of the identified 928 cells as the selected compound structure type or not the selected compound structure type.

Returning to FIG. 9, the method 900 may, for any cells not identified at 928 as containing at least one of the identified 924 connected components (e.g., cell $608_4$ in FIG. 6), categorize 940 any portions of such cells that are not overlapped by other cells categorized as the selected compound structure type as falling within not the selected compound structure type. With reference to FIG. 6, for instance, cell $608_4$ does not contain any of the identified 924 components 612, 616, 620, 624, 628. However, cell $608_4$ is partially overlapped by cell $608_2$ which includes connected components 612, 624. In this regard, the portion 609 of cell $608_4$ not overlapped by cell $608_2$ may be automatically categorized as not falling within the selected compound structure type. In one arrangement, the remaining portion 610 of cell $608_4$ may be automatically categorized in the same manner as cell $608_2$. In another arrangement, the remaining portion 610 of cell $608_4$ may be categorized according to any appropriate logic or algorithm that factors in contributions from both of cells $608_2$ and $608_4$ (as portion 610 is also an overlapping portion of cells $608_2$ and $608_4$).

The categorized cells 276 may be used by the mapping engine 236 to prepare one or more resultant images 280 (e.g., of the same spatial extent as the one or more input overhead images) that depict the selected compound structure type at appropriate locations in the geographic area. See FIG. 2. For instance, any pixels of the one or more input overhead images falling within a cell categorized as the selected compound structure type may be labeled as the selected compound structure type while all other pixels may not be labeled as the selected compound structure type. Those pixels labeled as representing the selected compound structure type may be appropriately colored, shaded, etc. to depict that such pixels represent the selected compound structure type.

Figure 20:
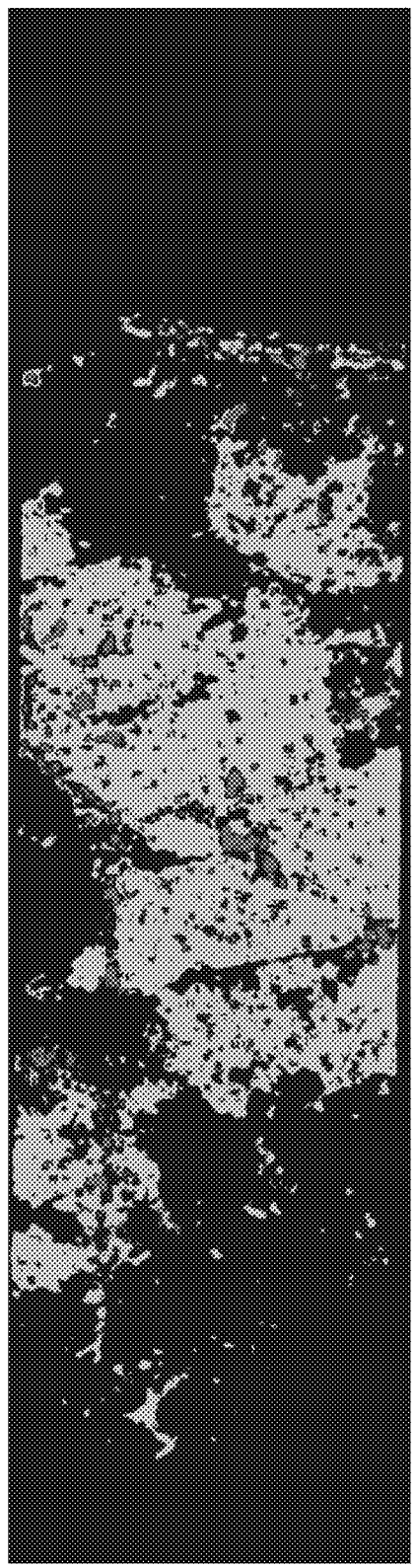
FIG. 20 is a resultant image or information layer corresponding to the multispectral image of FIG. 12 that depicts the three compound structure types of FIGS. 14-16.

The methods in FIGS. 9-12 may be performed with respect to other selected compound structure types with the same or different dictionaries 256 of visual words 260, the same or different identified 912 visual words (e.g., different subsets of visual words), with the same or different grids having various cell parameters (e.g., same or different width and overlap parameters, w, r), etc. to categorize other cells of other grids, where each query for each respective selected compound structure type is a "one v. rest" query (i.e., does each cell fall within the selected compound structure type class or all other compound structure type class?). The various queries may be merged in any appropriate manner to generate a resultant image that depicts various compound structure types within a geographic area. For instance, see FIG. 20 which presents an image of Rio de Janeiro, Brazil of the same spatial extent of that in FIG. 13 and that depicts informal settlements (e.g., slums), residential patterns, and urban patterns in blue, green and red, respectively.

In one arrangement, the mapping engine 236 may maintain any appropriate data structure for each pixel of the one or more overhead images that keeps track of the categorization of each cell within which the pixel is disposed. For instance, assume that three different queries were run on the overhead image of FIG. 13 for informal settlements, residential patterns, and urban patterns, respectively. Also assume that after each query, the data structure of a particular pixel includes entries of 2, 0, 0 indicating that the pixel had fallen within cells categorized as an informal settlement during the informal settlement query but had not fallen within a cell categorized as either a residential or urban pattern. Thus, the particular pixel may be categorized as an informal settlement in the resultant image 280. However, assume now that the data structure of a particular pixel includes entries of 1, 1, 1 indicating that the pixel had fallen within a cell categorized as an informal settlement during the informal settlement query, a cell categorized as residential during the residential query, and a cell categorized as urban during the urban query. In this case, the mapping engine 236 may represent the pixel as a combination of blue, green and red; as a different color to indicate that it was not determined how the pixel should be categorized; or the like.

In one arrangement, the categorization engine 232 may maintain one or more inverted files 284 of connected components 244 indexed according to the particular visual word 256 by which the connected components are classified, store the inverted files 284 in storage 212, and then extract and load only those portions 288 needed in memory 204 during the categorization process (steps 912 and 924 in FIG. 9). The inverted files may allow for the compact (e.g., compressed) storage of the compound structure representation as well fast queries with a limited number of visual words. A different inverted file may be maintained for each visual word dictionary 260.

Figure 7:
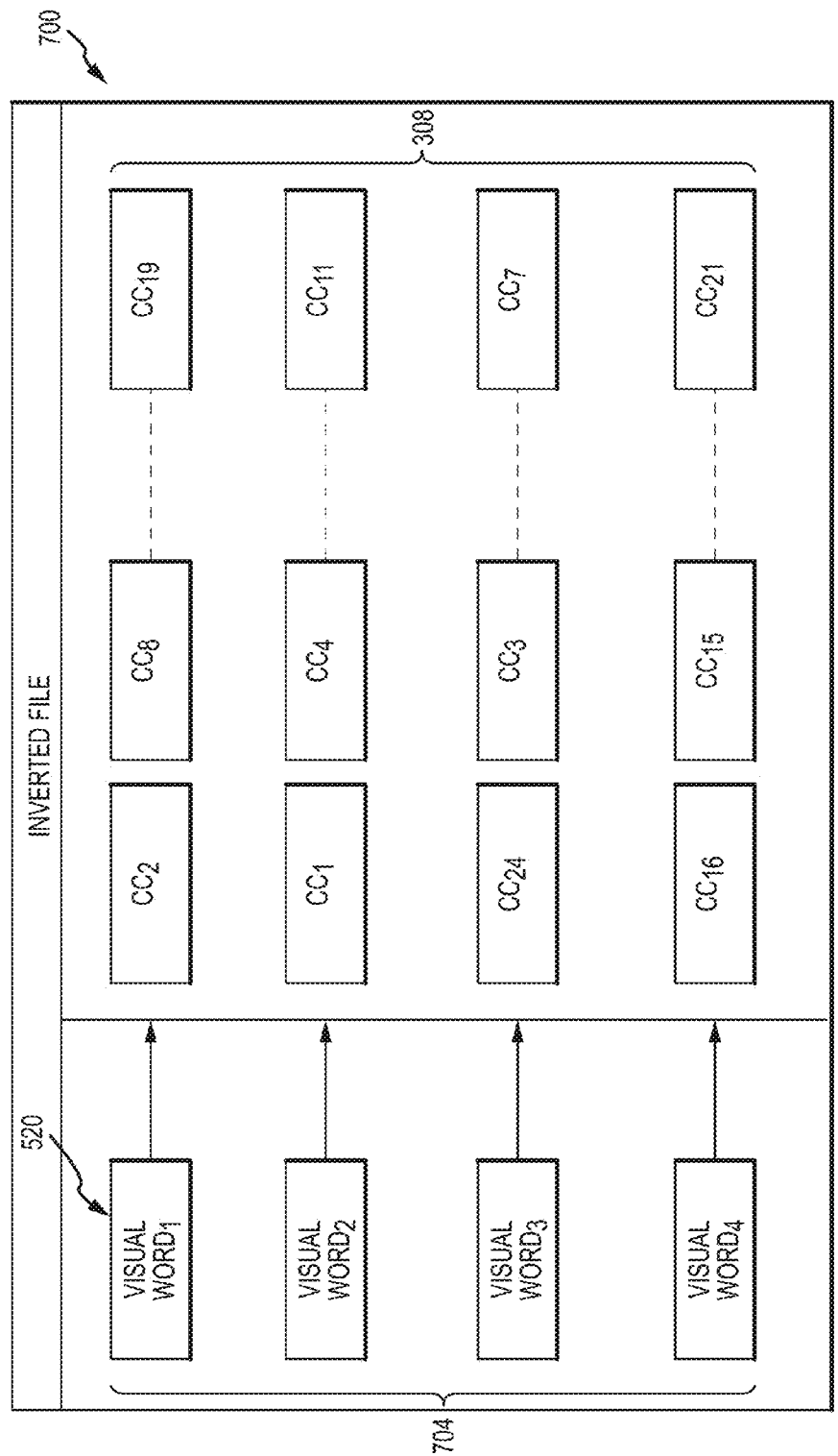
FIG. 7 is a simplified depiction of an inverted file for use in indexing connected components according to a visual word by which the connected components are classified.

For instance, FIG. 7 illustrates a schematic diagram of an inverted file 700 built with the visual words 520 of FIG. 5 and the connected components 308 of FIG. 3. As shown, the inverted file 700 includes a plurality of rows 704 each indexed according to one of the visual words 520 and each including a list of the components 308 classified by the visual word by which the row 704 is indexed (e.g., via the method 1100 of FIG. 11). For example, each connected component 308 in the inverted file 700 may be identified by a "bounding box" represented by a number of functions or coordinates that provide the spatial extent of the connected component 308 within the overhead image(s) of the geographic area and may include any other appropriate data or metadata for the connected component 308. In relation to example provided above in which the categorization engine 232 identifies Visual Word$_1$, Visual Word$_2$ and Visual Word$_4$ in FIG. 5 as representing the selected 904 compound structure type, the categorization engine 232 may automatically identify 924 the subset of connected components classified by the identified visual words by extracting the rows 704 of connected components 308 in the inverted file 700 indexed by Visual Word$_1$, Visual Word$_2$ and Visual Word$_4$ and loading the extracted rows into memory 204 for use in performing the identifying step 928, determining step 932, etc.

In one arrangement, only the connected components 308 representing salient structures need to be storage in the inverted file 700 which may only be a fraction of the total number of pixels. Furthermore, the size of the inverted file 700 need not necessarily depend on any cell parameters (e.g., the width and/or overlap parameters w, r) and may depend uniquely on the number of connected components classified by the particular visual words to make the inverted file adaptable to almost any choice of w and r as well as almost any choice of sub-clustering coming from the second hierarchical clustering structure (to create the visual words).

Non-Limiting Example:

A WorldView2 image acquired in July 2011 that is 8774×33975 pixels and that partially covers the city of Rio de Janeiro, Brazil is acquired. See FIG. 13. Patterns making up the following three classes of compound structure types in the city are analyzed: informal settlements, residential and industrial. Two examples of each class plus another class gathering the water, grassland and forest are provided for training the system. See FIG. 12. The examples (e.g., ROIs) provided for informal settlements, residential and industrial are provided in FIGS. 14-16. For instance, the informal settlements are made of small ground shelters that are very close to each other without any regular spatial arrangements. The residential parts contain houses and small buildings which are separated by roads and trees while highlighting at least some spatial arrangements. The industrial parts contain large buildings that are separated by large roads and that exhibit strong linear features on their roofs while being surrounded by many vehicles.

Figure 17A:
FIG. 17a illustrates a close up view of a portion of the multispectral image of FIG. 13.
Figure 17B:
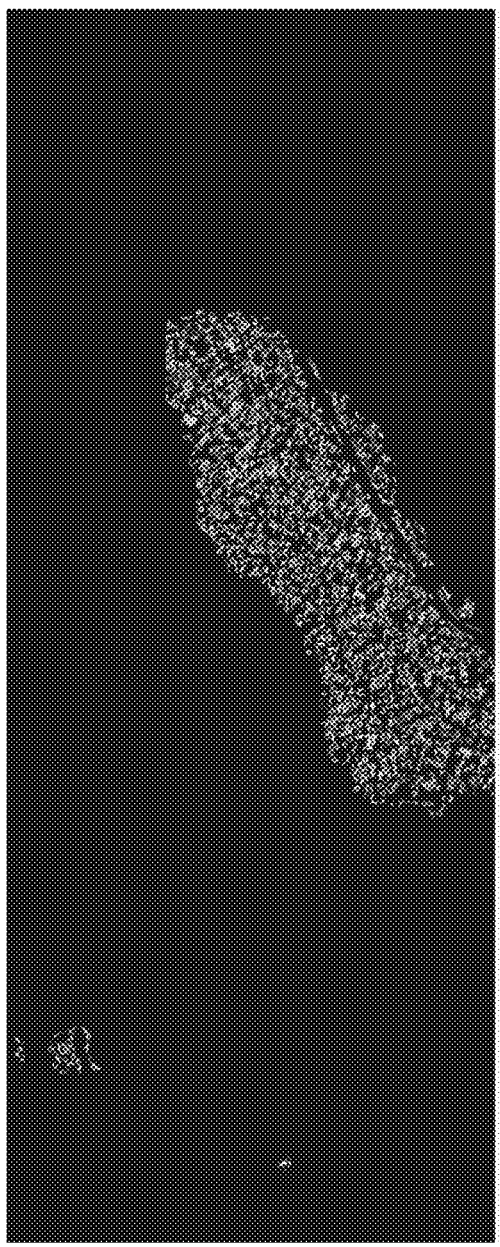
FIG. 17b illustrates visual words detected in the illustration of FIG. 17a that are used to detect the first compound structure type of FIG. 14, where different visual words are differently colored, shaded, etc.

In this experiment, 512 visual words are generated. During the learning phase, the typical compound structure scale is estimated to be around 100 meters which thus may define the width parameter of the tiles (e.g., cells) of the grid. Given an overlap of 80 meters between neighboring tiles, query results having a resolution of 20 meters are obtained. In this example, the representation, which is stored on 5% of the image storage space, allows the interactive classification of the equivalent of 877×3397 (≈3 million) tiles having each a distribution of 512 values (corresponding to the 512 visual words). During the learning stage, a threshold of 0.4 on the Pearson's correlation such that between 10% and 20% of the 512 visual words are retained for each query. FIGS. 17a, 18a, and 19a illustrate portions of informal settlements, residential parts, and industrial parts of the overhead image of FIG. 13, respectively. FIGS. 17b, 18b, and 19b illustrate a plurality of different combinations of connected components and their respective visual words over the informal settlements, residential parts and industrial parts of FIGS. 17a, 18a, and 19a, respectively. The resulting "one v. rest" queries (e.g., informal settlements v. everything else, residential v. everything else, etc.) are fused into a single classification shown in FIG. 20. The categorization of input overhead images as disclosed herein may be used in numerous contexts such as in assessing population densities, qualities of life, vulnerability factors, disaster risks, sufficiency of civil infrastructures, economic growth, poverty levels, event monitoring and evolution, and the like.

It will be readily appreciated that many deviations and/or additions may be made from or to the specific embodiments disclosed in the specification without departing from the spirit and scope of the invention. Embodiments disclosed herein can be implemented as one or more computer program products, i.e., one or more modules of computer program instructions encoded on a computer-readable medium for execution by, or to control the operation of, data processing apparatus. For example, the logic or software of the construction engine 228, classification engine 232 and mapping engine 236 responsible for the various functionalities disclosed herein may be provided in such computer-readable medium of the automated categorization system 200 and executed by the processor 208 as appropriate. The computer-readable medium can be a machine-readable storage device, a machine-readable storage substrate, a non-volatile memory device, a composition of matter affecting a machine-readable propagated signal, or a combination of one or more of them. In this regard, the system 200 may encompass one or more apparatuses, devices, and machines for processing data, including by way of example a programmable processor, a computer, or multiple processors or computers. In addition to hardware, the system 200 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., construction of the first and second hierarchical data structures and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

What is claimed is:

1. A method for use in identifying compound structures in overhead imagery, comprising:
    organizing, using a processor, a plurality of pixels of at least one input overhead image into a plurality of components of a first hierarchical data structure, wherein the input image is associated with a geographic area;
    deriving, using the processor, at least one image descriptor for each of the components;
    constructing, using the processor with at least some of the image descriptors, a second hierarchical data structure that includes a plurality of hierarchically-arranged levels of nodes, wherein the nodes of the second hierarchical data structure are arranged into a plurality of leaf paths that each extend from a root node to one of a plurality of leaf nodes, wherein each of the image descriptors depends from one of the plurality of leaf nodes, wherein at least one node at a particular one of the levels is a respective visual word, and wherein all of the visual words at the particular one of the levels collectively comprise a visual dictionary;
    selecting a type of compound structure to be identified in the at least one input overhead image;
    overlaying a grid of cells onto the at least one input overhead image, wherein the overlaying includes selecting a width of each cell in the grid to be approximately equal to a spatial extent of the selected compound structure type;
    determining, for at least some of the cells of the grid of cells, a frequency of each of one or more of the visual words in the cell;
    generating, for each of the at least some of the cells, a vector that includes a plurality of entries, wherein each entry includes a value that represents a respective one of the frequencies; and
    for each of the at least some of the cells, using its vector to categorize the cell as representing or not representing the selected compound structure type.

2. The method of claim 1, wherein the determining step includes:
    identifying at least one of the plurality of components within the cell;
    ascertaining a smallest distance between the at least one image descriptor of the identified component and each of the at least one image descriptor depending from each of a plurality of the visual words; and
    classifying, based on the ascertaining step, the component as a particular one of the visual words associated with the smallest distance, wherein the classifying step contributes to the frequency of the particular one of the visual words in the cell vector.

3. The method of claim 2, wherein the determining step further includes:
    identifying another of the plurality of components within the cell;
    ascertaining a smallest distance between the at least one image descriptor of the identified another component and each of the at least one image descriptor depending from each of the plurality of the visual words; and
    classifying, based on the ascertaining step, the another component as another particular one of the visual words associated with the smallest distance, wherein the classifying step contributes to the frequency of the another particular one of the visual words in the cell vector.

4. The method of claim 1, wherein the grid of cells is defined by an overlap parameter that sets forth a displacement between adjacent cells of the grid of cells.

5. The method of claim 4, wherein the compound structure type is a first compound structure type and the grid of cells is a first grid, wherein the method further includes:
    selecting a second type of compound structure to be identified in the at least one input overhead image;
    overlaying a second grid of cells onto the at least one input overhead image, wherein the overlaying includes selecting a width of each cell in the second grid to be approximately equal to a spatial extent of the second selected compound structure type;
    generating, for at least some of the cells of the second grid, a vector that includes a plurality of entries, wherein each entry includes a value that represents a respective frequency of one of the visual words in the cell; and
    for each of the at least some of the cells of the second grid, using its vector to categorize the cell as representing or not representing the second selected compound structure type.

6. The method of claim 5, wherein one of the entries of the cell vectors of the first grid includes a value that represents a frequency of a first of the visual words in the cell, wherein one of the entries of the cell vectors of the second grid includes a value that represents a frequency of a second of the visual words in the cell, and wherein the first and second visual words are different.

7. The method of claim 1, wherein the using includes:
    identifying a frequency of one or more of the visual words describing the selected compound structure type;
    analyzing the entries of the vector in relation to the identified visual word frequencies of the selected compound structure type.

8. A method for use in characterizing areas of interest in overhead imagery, comprising:
    organizing, using a processor, a plurality of pixels of at least one input overhead image into a plurality of components of a first hierarchical data structure, wherein the input image is associated with a geographic area;
    deriving, using the processor, at least one image descriptor for each of the components;
    constructing, using the processor with at least some of the image descriptors, a second hierarchical data structure that includes a plurality of hierarchically-arranged levels of nodes, wherein the nodes of the second hierarchical data structure are arranged into a plurality of leaf paths that each extend from a root node to one of a plurality of leaf nodes, wherein each of the image descriptors depends from one of the plurality of leaf nodes, wherein at least one node at a particular one of the levels is a respective visual word, and wherein all of the visual words at the particular one of the levels collectively comprise a visual dictionary;

determining, for each cell of at least some cells of a grid of cells disposed over the geographic area, a frequency of each of one or more of the visual words in the cell;

generating, for the cell, a vector that includes a plurality of entries, wherein each entry includes a value that represents a respective one of the frequencies identifying a subset of visual words of the visual dictionary that corresponds to an area of interest in the input overhead image;

identifying a subset of the plurality of components classified by one of the visual words in the subset of visual words; and identifying a subset of the plurality of cells that each fully contain at least one of the components in the subset of components, wherein the determining and generating steps are performed only with respect to the subset of visual words and the subset of cells.

9. The method of claim 8, wherein each of at least some of the components in the subset of components is fully contained within at least two of the cells.

10. The method of claim 8, further including:
assigning respective weighting values to each of the visual words in the subset of visual words, wherein each weighting value represents a degree to which the respective visual word indicates an area of interest;
for each cell of the subset of cells:
obtaining, for each entry in its cell vector, a product of the entry and a corresponding one of the weighting values to obtain a plurality of products;
summing the plurality of products to obtain a sum;
identifying the cell as the area of interest if the sum has one of i) reached or exceeded a threshold and b) not reached the threshold; and
identifying the cells as not the area of interest of the sum has the other of i) reached or exceeded the threshold and b) not reached the threshold.

11. The method of claim 8, further including:
classifying each of the plurality of components as one of the plurality of visual words;
storing, in a storage device, each of the plurality of components in a data structure that is indexed according to the plurality of visual words;
extracting the components indexed according to the subset of visual words, wherein the extracted components are the subset of components; and
loading the extracted components and subset of visual words into memory, wherein the determining and generating steps are performed with respect to the extracted components and subset of visual words as loaded into memory.

12. The method of claim 1, further including:
classifying each of the plurality of components as one of the plurality of visual words;
storing, in a storage device, each of the plurality of components in a data structure that is indexed according to the plurality of visual words.

13. The method of claim 1, wherein the visual dictionary is a first visual dictionary, and wherein all of the visual words at another particular one of the levels collectively comprise a second visual dictionary at least partially different than the first visual dictionary.

14. A method of characterizing areas of interest in overhead imagery, comprising:
organizing, with a processor, an input overhead image associated with a geographic area into a plurality of components of a first hierarchical data structure;
clustering, with the processor, a plurality of image descriptors derived from the plurality of components into a plurality of visual words of a visual dictionary;
selecting a type of compound structure to be identified in the input overhead image;
overlaying a grid of cells onto the input overhead image, wherein the overlaying includes selecting a width of each cell in the grid to be approximately equal to a spatial extent of the selected compound structure type;
categorizing, with the processor, each of the cells as representing or not representing the selected compound structure type based on one or more respective ones of the visual words in the cells.

15. The method of claim 14, wherein the categorizing includes:
determining, for each of the cells, a frequency of the one or more visual words in the cell;
identifying frequencies of the one or more of the visual words that describe the selected compound structure type;
comparing the frequencies of the one or more visual words in the cell to the identified frequencies of the one or more visual words that describe the selected compound structure type to categorize the cell as representing or not representing the selected compound structure type.

16. The method of claim 15, wherein the characterizing step utilizes less than all of the entries in the vector.

17. The method of claim 15, further including:
mapping the plurality of cells into a resultant image that is associated with the geographic area, wherein each cell in the resultant image indicates whether or not it represents the selected compound structure type.

18. The method of claim 15, wherein the identifying includes:
selecting a sample of a portion of the input overhead image that includes the selected compound structure type;
determining, for the sample, the frequencies of the one or more of the visual words in the sample; and
generating, for the sample, a vector that includes a plurality of entries, wherein each entry includes a value that represents a respective one of the visual word frequencies, wherein the comparing uses the sample vectors and the cell vectors.

* * * * *